(12) United States Patent
Grabowski et al.

(10) Patent No.: US 7,562,503 B2
(45) Date of Patent: Jul. 21, 2009

(54) SELF-FORMING STRUCTURES

(76) Inventors: Richard M. Grabowski, 3316 Langley Ct., Flower Mound, TX (US) 75022-2876; Suzan A. Grabowski, 3316 Langley Ct., Flower Mound, TX (US) 75022-2876

( * ) Notice: Subject to any disclaimer, the term of this patent is extended or adjusted under 35 U.S.C. 154(b) by 205 days.

(21) Appl. No.: 11/592,563

(22) Filed: Nov. 2, 2006

(65) Prior Publication Data

US 2007/0102112 A1    May 10, 2007

Related U.S. Application Data

(60) Provisional application No. 60/732,474, filed on Nov. 2, 2005.

(51) Int. Cl.
   *E04C 1/00*    (2006.01)
(52) U.S. Cl. .................. 52/309.4; 52/293.3; 52/309.15; 52/309.7
(58) Field of Classification Search .................. 52/410, 52/309.7, 309.11, 309.15, 309.16, 309.4, 52/293.3, 270, 271, 274; 264/256, 253, 254, 264/274, 277, 279
   See application file for complete search history.

(56) References Cited

U.S. PATENT DOCUMENTS

| | | | |
|---|---|---|---|
| 2,728,702 A | 12/1955 | Simon et al. | |
| 3,622,435 A * | 11/1971 | Cacella | 442/374 |
| 3,944,704 A | 3/1976 | Dirks | |
| 3,968,620 A | 7/1976 | Keltner | |
| 4,178,161 A | 12/1979 | Rudner et al. | |
| 4,221,619 A | 9/1980 | Lemons | |
| 4,418,514 A | 12/1983 | Spann | |
| 4,419,261 A | 12/1983 | Takahashi | |
| 4,451,310 A | 5/1984 | Lairloup | |
| 4,540,455 A | 9/1985 | Brewer | |
| RE32,038 E | 11/1985 | Clear et al. | |
| 4,625,012 A | 11/1986 | Rizk et al. | |
| 4,810,536 A | 3/1989 | Jansen et al. | |
| 4,820,579 A | 4/1989 | Aszman | |
| 4,826,948 A | 5/1989 | Jansen et al. | |
| 4,888,225 A | 12/1989 | Sandvig et al. | |

(Continued)

OTHER PUBLICATIONS

H.G. Scholten, J.G. Schuhmann, and R.E. Tenhoor; *The New Process Control for Making Polyether Urethane Foams*; The Dow Chemical Co., Midland, Mich.; vol. 52, No. 7, Jul. 1960, p. 613.

(Continued)

*Primary Examiner*—Richard E Chilcot, Jr.
*Assistant Examiner*—Chi Q Nguyen
(74) *Attorney, Agent, or Firm*—Haynes and Boone, LLP

(57) ABSTRACT

A process for the manufacture, storage and final assembly of self-erecting structures constructed from a plurality of materials and or articles, some or all of which may be flexible and some or all may be impregnated with a curable polymer compound. The structure is folded to reduce its volume and stored in a vacuum sealed package to further reduce its volume and to prevent the impregnated curable polymer compound from curing until such time as curing is desired. When the structure is removed from the vacuum sealed packaging, it returns to its original geometry through the elastomeric memory properties of the materials used to construct the shelter. Once the shelter is removed from the vacuum sealed packaging, curing of the curable polymer compound is naturally or artificially initiated.

24 Claims, 13 Drawing Sheets

U.S. PATENT DOCUMENTS

| | | | |
|---|---|---|---|
| 5,096,206 | A | 3/1992 | Andre et al. |
| 5,151,484 | A | 9/1992 | Schmalstieg et al. |
| 5,345,738 | A * | 9/1994 | Dimakis ................ 52/309.9 |
| 5,350,777 | A | 9/1994 | Yuge et al. |
| 5,725,704 | A | 3/1998 | Gallagher et al. |
| 5,816,014 | A * | 10/1998 | Tzeng et al. ............. 52/745.19 |
| 5,830,399 | A * | 11/1998 | Keith et al. ................ 264/253 |
| 5,888,329 | A | 3/1999 | Cho et al. |
| 5,987,834 | A * | 11/1999 | Keith et al. ................... 52/410 |
| 6,019,996 | A | 2/2000 | Cheong |
| 6,077,902 | A | 6/2000 | Roesler et al. |
| 6,205,728 | B1 | 3/2001 | Sutelan |
| 6,295,786 | B1 | 10/2001 | Lee |
| 6,298,619 | B1 * | 10/2001 | Davie ....................... 52/293.3 |
| 6,403,195 | B1 | 6/2002 | Montagna et al. |
| 6,481,172 | B1 | 11/2002 | Porter |
| 6,599,621 | B2 | 7/2003 | Porter |
| 6,620,459 | B2 | 9/2003 | Colvin et al. |
| 6,698,149 | B1 | 3/2004 | Ruchgy |
| 6,769,220 | B2 * | 8/2004 | Friesner ....................... 52/605 |

OTHER PUBLICATIONS

Adolfas Damusis, J.M. McClellan, H.G. Wissman, C.W. Hamilton, and K.C. Frisch; *Polyether Urethane Elastic Sealants*; Wyandotte Chemicals Corp., Wyandotte, Mich., vol. 1, No. 4, Dec. 1962, p. 269-274.

Richard E. Mericle II; *Polyurethane*; Modern Plastics Mid-October Encyclopedia Issue, Resins and Compounds; pp. 153-155.

Bayer MaterialScience; Desmodur E 28, *Aromatic Polyisocyanate Prepolymer*; Product Code DA133; Jun. 30, 2002.

Bayer MaterialScience; Desmodur E 743, *Aromatic Polisocyanate*; Product Code D301; Jun. 30, 2002.

International Search Report mailed Jul. 7, 2008, by the ISA/US in connection with International Application No. PCT/US2006/043043.

Written Opinion mailed Jul. 7, 2008, mailed Jul. 7, 2008, by the ISA/US in connection with International Application No. PCT/US2006/043043.

* cited by examiner

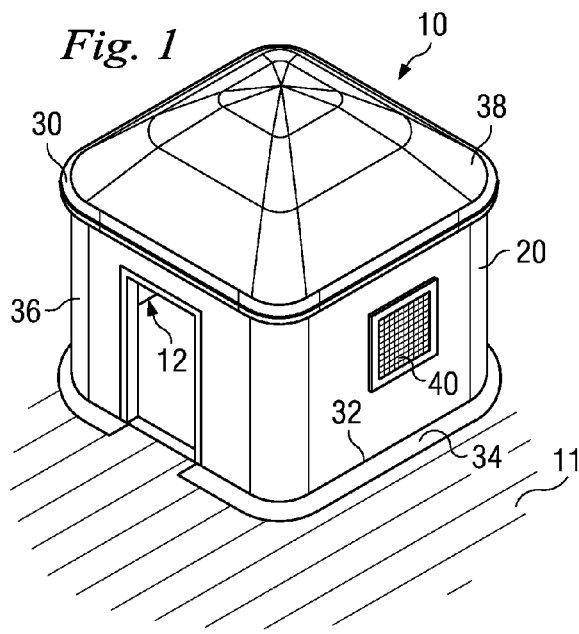
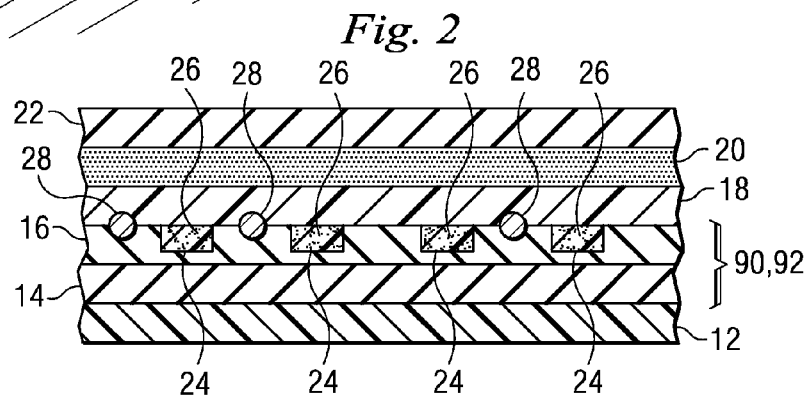
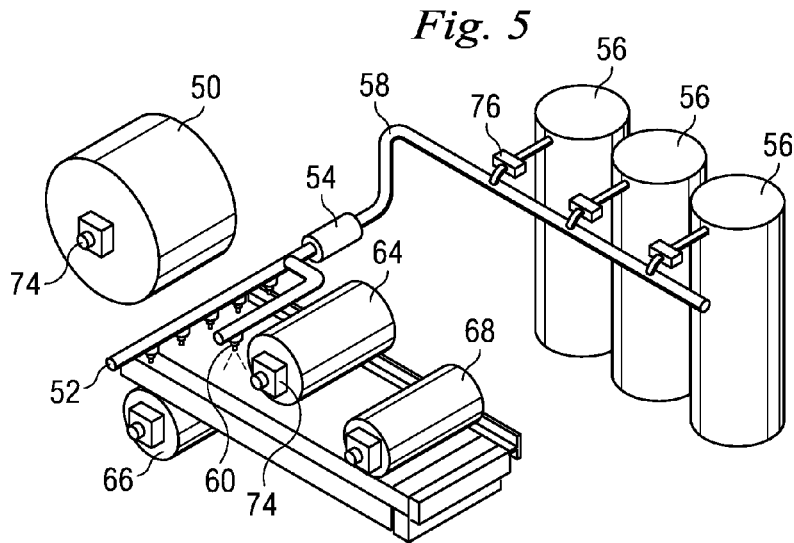

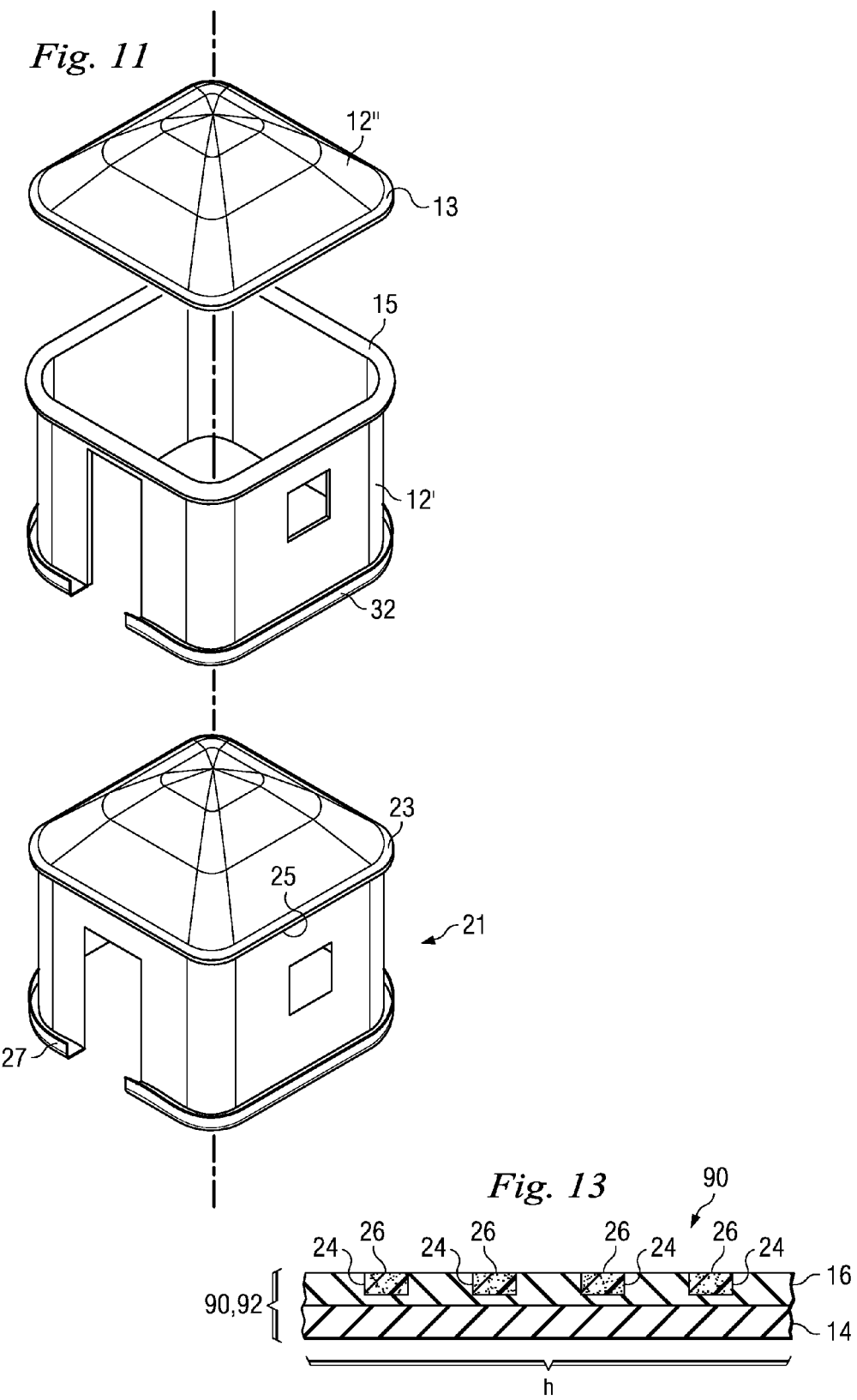

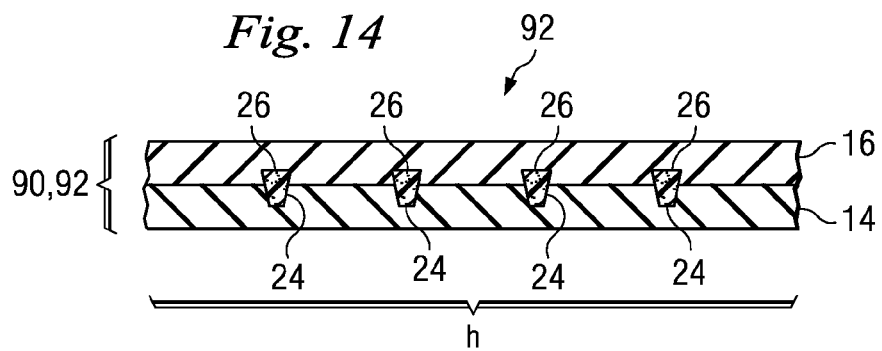
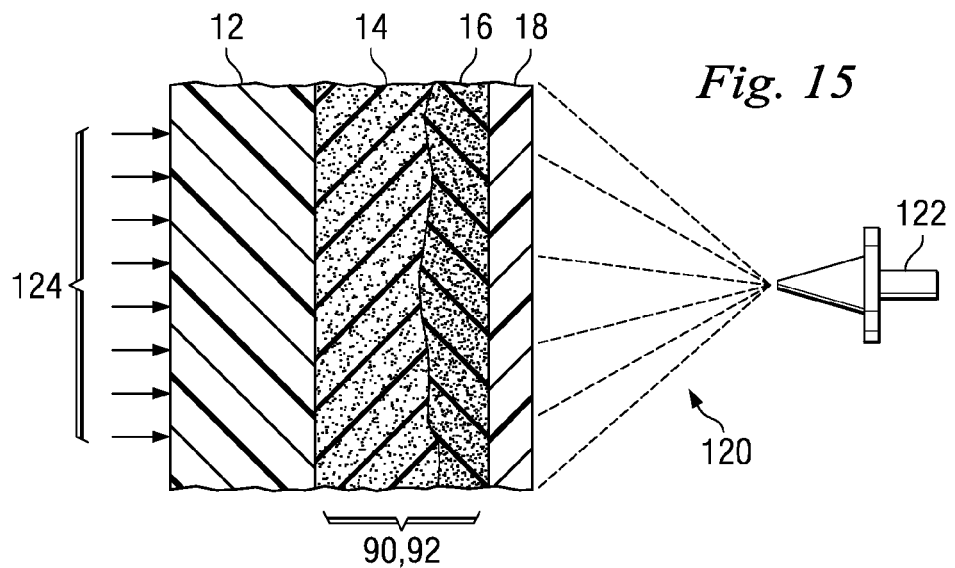
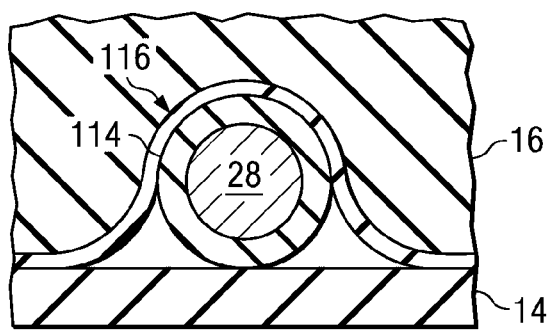
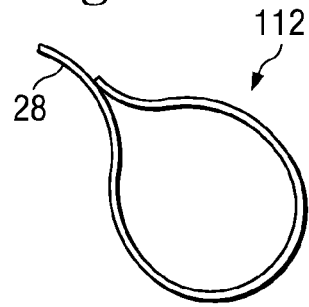

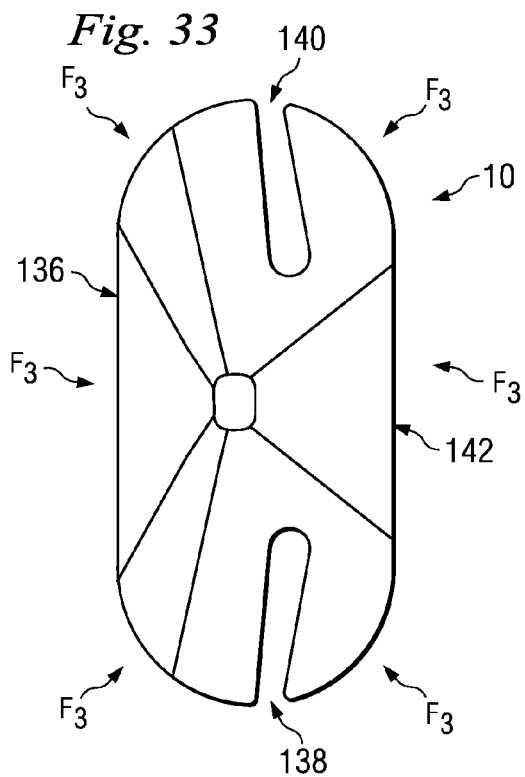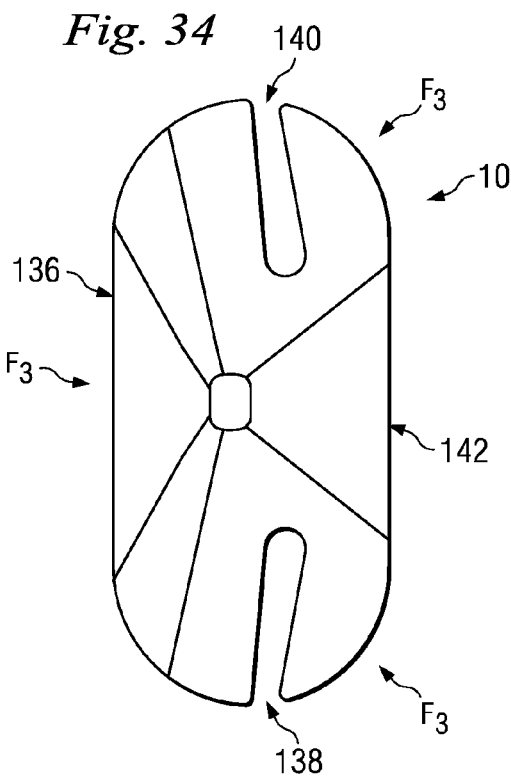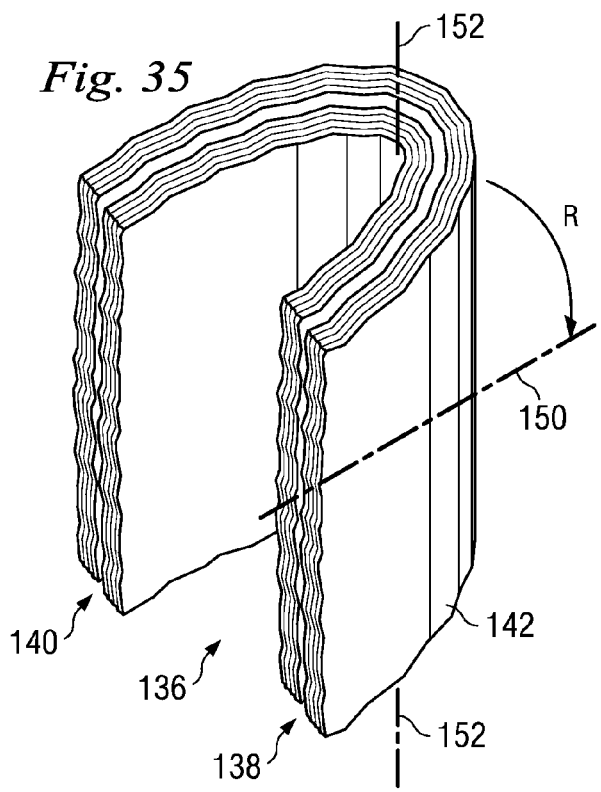

SELF-FORMING STRUCTURES

BACKGROUND

The present embodiments relate generally to structures made from materials that are impregnated or saturated with a curable polymer compound, methods for the formation of such structures, and methods for the erection of such structures. In one such embodiment, the structure comprises a shelter.

SUMMARY OF THE INVENTION

U.S. Pat. Nos. 5,345,738 and 5,725,704 describe panels made from materials that have been impregnated with a polyisocyanate resin.

BRIEF DESCRIPTION OF FIGURES

FIG. 1 illustrates a perspective view of an embodiment of a structure as described herein.

FIG. 2 illustrates a horizontal cross-sectional view of a completed wall or roof section of the structure illustrated in FIG. 1.

FIG. 5. illustrates a perspective view of a spraying and pressing process used in forming materials used in construction of the structure described herein.

FIG. 11 illustrates an exploded view of the shell components of the walls and roof of the structure illustrated in FIGS. 1 and 9 and a curing fixture.

FIG. 13 illustrates a horizontal cross-sectional view of a wall core of an embodiment of the structure illustrated in FIG. 1.

FIG. 14 illustrates a cross-sectional view of a roof core of an embodiment of the structure illustrated in FIG. 1.

FIG. 15 illustrates a schematic view of a method of adhering a moisture barrier to a wall core of the structure illustrated in FIG. 1 by applying steam.

FIG. 16 illustrates a cross-sectional view of an embodiment of a capture member of the capture system illustrated in FIG. 14.

FIG. 17 illustrates a looped end of the capture system illustrated in FIG. 16.

FIGS. 30-35 illustrate a schematic view of a method of folding the structure illustrated in FIG. 1 to reduce its dimensions for packaging.

DETAILED DESCRIPTION

Structures made from materials that are impregnated or saturated with a curable polymer compound, and methods for the formation of such structures, are described herein.

According to certain embodiments, the structures can be panels, bricks, roof members, and vertical or horizontal support members. In other embodiments, the structures can be furniture, boats, or toys. According to still other embodiments, the structure comprises a shelter.

In some embodiments of the structures described herein, flexible materials are used in construction of the structure, which flexible materials readily absorb liquid additives or additives suspended in liquids. In the case of shelters, this means that flame retardants and pesticides can be easily incorporated into the structure. In most such embodiments the flexible materials comprising the structure are kept dry or are treated to remove moisture before such additives are applied.

In addition, the flexible materials used for structures as described herein, for example any foam or felt materials used to form a shelter, are preferably those that are resistant to sea salt, acids, acid rain, insects and molds, are naturally hydrolysis resistant, highly abrasion resistant, have high load deflection ratings, and have high shock ratings. In most embodiments these materials will also resist rot and be highly insulated.

Figure 3:
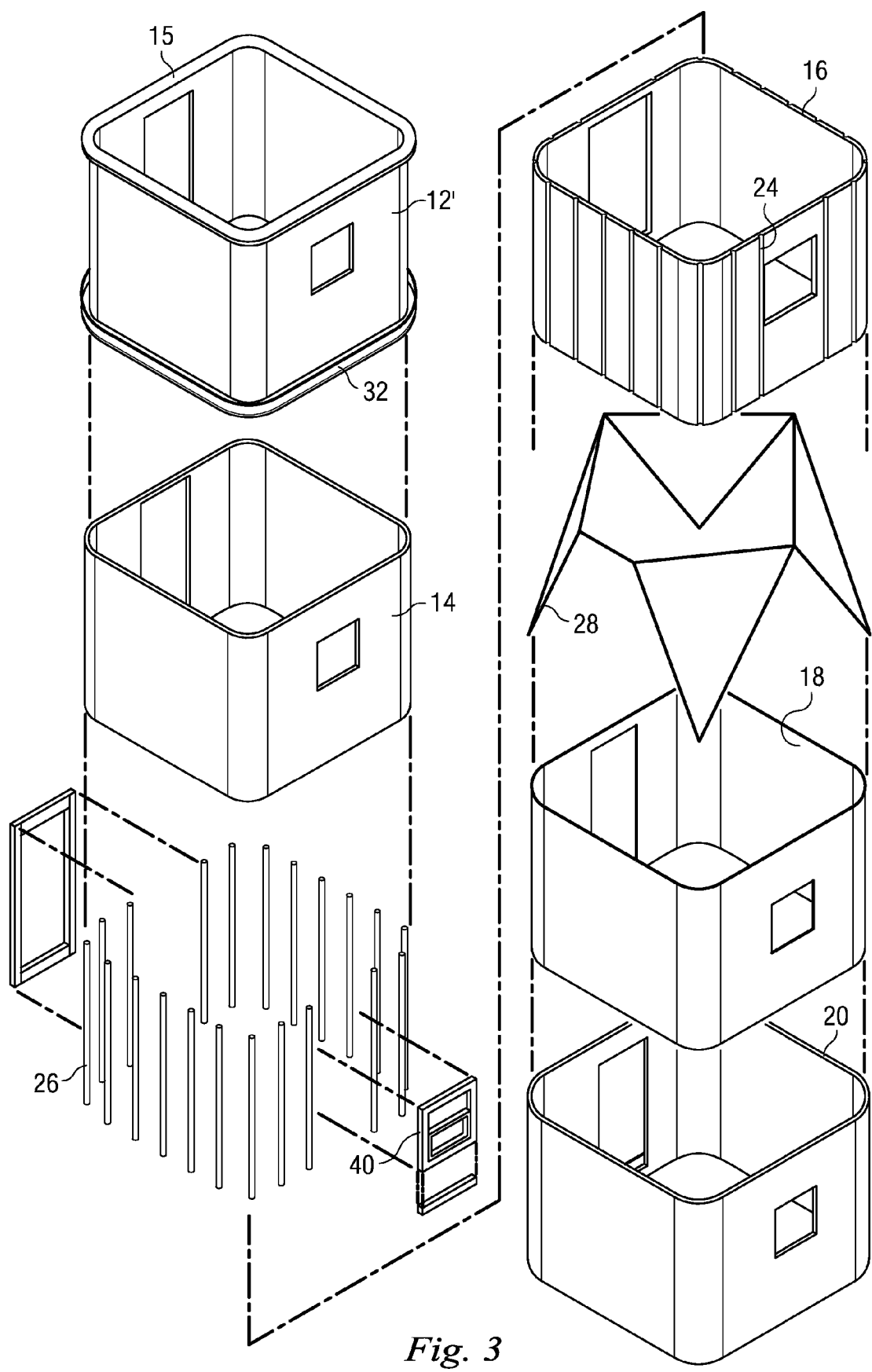
FIG. 3 illustrates an exploded view of a wall of the structure illustrated in FIG. 1.

Referring now to FIGS. 1, 2 and 3, multiple representations of an embodiment of a shelter 10 are illustrated. FIG. 1 illustrates a completed, fully erected structure 10 for which a shell 12 of walls 36, a roof 38, a roof-to-wall seam 30 at the junction of the walls 36 and roof 38, and optionally a window unit 40 are shown. As shown in the embodiment of FIG. 1, the shelter 10 may include a lip 32, which extends radially from the bottom of shell 12 and then upward. In some embodiments, the shelter 10 includes a lower edge flap 34, which is attached to the bottom of wall 36, as shown in FIG. 1.

FIG. 2 illustrates a horizontal cross-section of a wall 36 or roof 38 of an embodiment of a completed shelter 10. As shown in FIG. 2, the wall 36 and roof 38 of the completed shelter 10 each include a shell 12, an inner core layer 14, an outer core layer 16, a moisture barrier 18, a shelter covering 20, and a polyethylene sheet 22 that is removable during erection of the shelter 10. In the embodiment shown in FIG. 2, slots 24 are provided in outer core layer 16 to accommodate support members 26 and capture members 28 (described in further detail herein), which support members 26 and capture members 28 are incorporated into the shelter 10 between the outer core layer 16 and the moisture barrier 18.

FIG. 3 is an exploded view of an embodiment of a wall 36 of an erected shelter 10 that comprises the layers described above as they are depicted in FIG. 2, with the exception of the polyethylene sheet 22, which is removed during erection of the structure 10 (as described in further detail herein).

Figure 4:
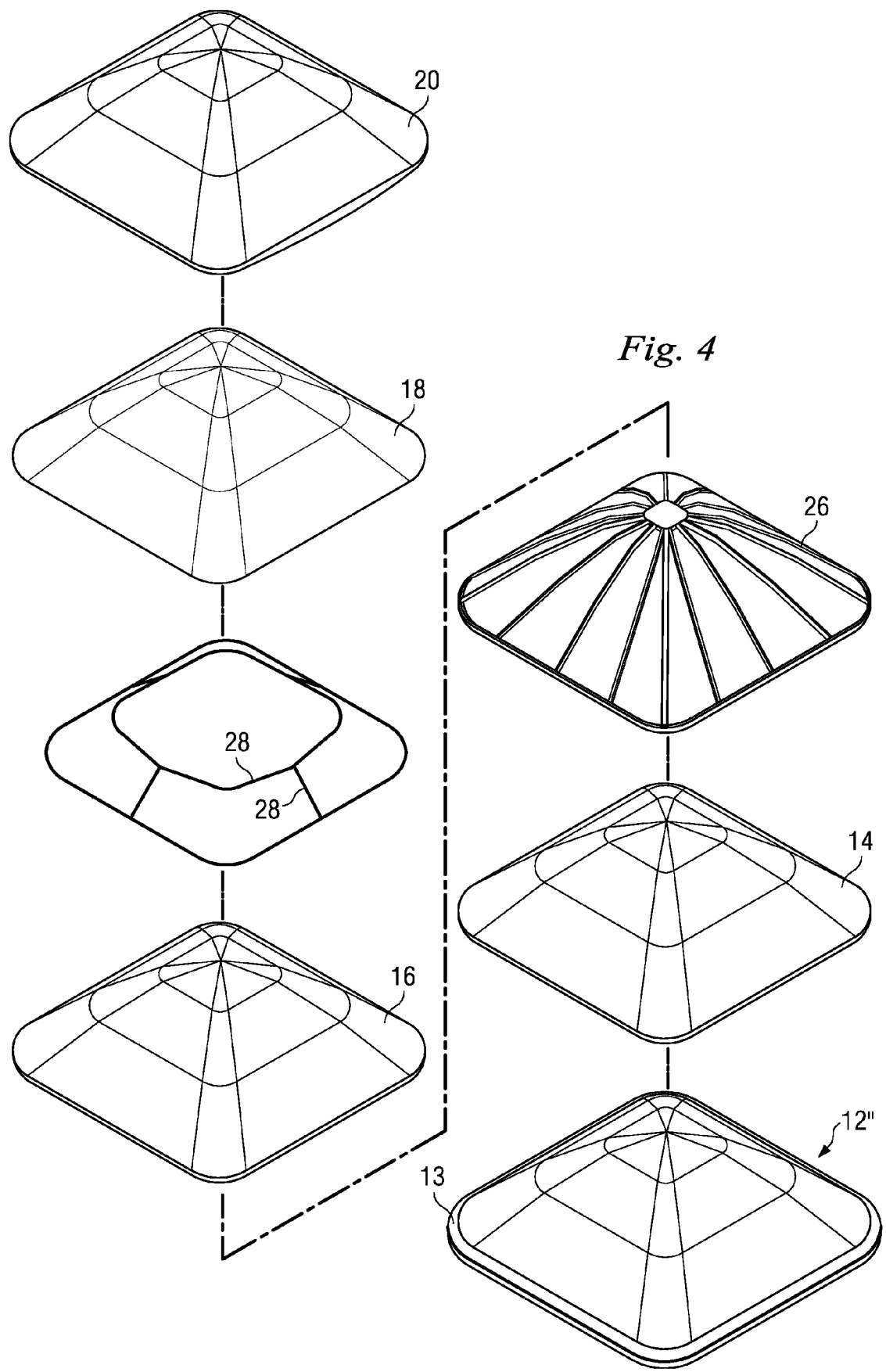
FIG. 4 illustrates an exploded view of a roof of the structure illustrated in FIG. 1.

FIG. 4 is an exploded view of another embodiment of a roof 38 of an erected shelter 10 that comprises an arrangement of the components described above that differs somewhat from the arrangement depicted in FIGS. 2 and 3. Aside from the absence of the polyethylene sheet 22, which is removed during erection of the shelter 10 and distinguishes this embodiment from that illustrated in FIG. 2, this embodiment differs from that illustrated in FIG. 3 by placing the support members 26 between the inner core layer 14 and the outer core layer 16. In this embodiment, support members 26 are disposed between the inner core layer 14 and the outer core layer 16, rather than between the outer core layer 16 and the moisture barrier 18 as illustrated in FIG. 3.

In certain embodiments of shelter 10, generally described above, any of the shell 12, inner core layer 14, outer core layer 16, moisture barrier 18, shelter covering 20, support members 26, roof-to-wall seam 30, and lower edge flap 34 can be made from sheets of flexible material of any suitable expanded, reticulated, or open cell plastic material such as a polyether, polyolefin, polyester, polyurethane, or any combination thereof that is impregnated or saturated with a curable polymer compound during manufacture and cured upon erection of the shelter. In one embodiment, the flexible material is polyester felt.

In some embodiments of the shelter 10, each layer of a flexible material that is impregnated with a curable polymer compound is cured prior to assembly of the shelter 10. In other embodiments, the shelter 10 can be completely assembled when only the curable polymer compound impregnated into the shell 12 has cured appreciably.

In some such embodiments, the curable polymer compound applied to the various layers and components of shelter 10 is a compound selected from the group comprising isocyanates and having consequently at least one —NCO group in its formula. Examples of compounds belonging to the isocyanate group are the isocyanates themselves (pure or raw) such as TDI (toluene diisocyanate) or MDI (4,4'-diphenylmethane diisocyanate), the polymers of isocyanates containing at least one terminal —NCO group, and generally, any compound having at least one —NCO termination in its molecule.

In some embodiments, the polymer compound may be cured by reaction of the isocyanate radicals in the polymer compound with water. The polymer compound may also be cured by other techniques well-known to those or ordinary skill in the art such as by exposure to an amine or by means of the application of heat to the polymer compound.

In some embodiments, the polymer compound is moisture-curable and includes 4,4'-diphenylmethane diisocyanate and has an —NCO content of from about 7.8% to about 8.2% and a viscosity of from about 1700 to about 3330 mPa·s at 25° C. One such moisture-curable polymer compound is commercially available from Bayer MaterialScience under the tradename Desmodur E 743. Those of ordinary skill in the art understand that %—NCO is a measure of the isocyanate content of a pre-polymer or other isocyanate-containing compound measured as the weight percent of unreacted isocyanate groups in the material.

In other such embodiments, the moisture-curable polymer compound is a polyisocyanate pre-polymer based on diphenylmethane diisocyanate and has an —NCO content of from about 15.5% to about 17.5%, and a viscosity of from about 5200 to about 7000 mPa·s at 25° C. One such moisture-curable polymer compound is commercially available from Bayer MaterialScience under the tradename Desmodur E 28.

Those of ordinary skill in the art will understand that any moisture-curable polymer compound such as those disclosed in U.S. Pat. Nos. 4,826,948 and 6,077,902, the entire disclosures of which are hereby incorporated herein by reference, may be used to impregnate the flexible material.

Impregnating the flexible material with a curable polymer compound fills open cells or pores in the material, which prevents the penetration of moisture and air through the flexible material. Upon erection of the shelter 10, the curable polymer compound is cured, which causes the flexible material to become rigid. In other embodiments, the shelter components may be treated with other additives, for example carbon black for solar absorption, dry color pigments, foaming agents, and fire resistant materials, or with curing initiators.

Figure 6:
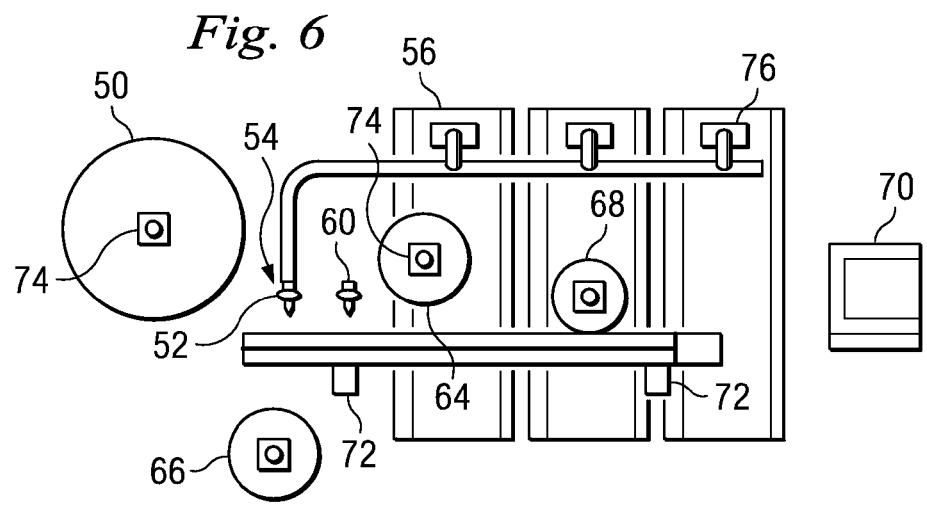
FIG. 6 illustrates a schematic view of the spraying and pressing process illustrated in FIG. 5.

A method for applying polymer compounds, additives, and curing initiators to the flexible material is shown diagrammatically in FIGS. 5 and 6 and includes processing the flexible material through a continuous spray operation that can be followed by a pressing operation.

The movement of the flexible material through the spraying and pressing operations can be accomplished by a conveyor belt system or any similar systems known to those of ordinary skill in the art. The flexible material is unwound from a continuous roll of flexible material 50 and is passed below spray nozzle array 52. The spray nozzle array 52 releases the curable polymer compound or other additive onto the surface of the flexible material facing the array. In certain embodiments, the curable polymer compound is applied to and impregnated within the flexible material at a rate yielding about 0.25 to about 0.35 lbs per sq foot of flexible material. In certain embodiments, the curable polymer compound is heated by a heating element 54 to a temperature of from about 95° F. to about 140° F. to reduce the viscosity of the curable polymer compound. In certain embodiments, a reduction in the viscosity of the curable polymer compound aids in the saturation of the flexible material with the curable polymer compound.

Additives, including but not limited to those described above, can also be applied to the surface of the flexible material through the spray nozzle array 52. For example, such additives can be mixed with the curable polymer compound, which mixture is then sprayed on the flexible material. Such additives, and the curable polymer compound, can be supplied to the spray nozzle array 52 from storage tanks 56 by conduit 58, operably connected thereto. Any number of storage tanks 56 can be provided to store feeds of a curable polymer compound and other additives.

After application of the curable polymer compound, curing initiators can be applied to the flexible material by one or more sprayers 60. Curing initiators can be stored in one of storage tanks 56, which tank would be separate from the storage tanks used to store a curable polymer compound and other additives. In certain embodiments, warm water is used as a curing initiator. According to one such embodiment, the water has a temperature of from about 90° F. to about 130° F. and is applied to the flexible material as part of a mixture that is between about 0.75 and about 1.2 parts water to about 10 parts curable polymer compound. In other embodiments, an amine catalyst is used as a curing initiator. One suitable amine catalyst is commercially available from Air Products, Inc. under the trade name DABCO R8020 and is applied at a rate of from about 0.1% to about 0.2% catalyst to curable polymer compound. Those of ordinary skill in the art will recognize that other suitable, commercially available amine catalysts, such as triethyl-amine, and those known under the trade names "Niax," available from Union Carbide Corporation, "Polycat," available from Abbott, and "Thancat," available from Jefferson Chemical Company, and other curing initiators may also be used.

Figure 8:
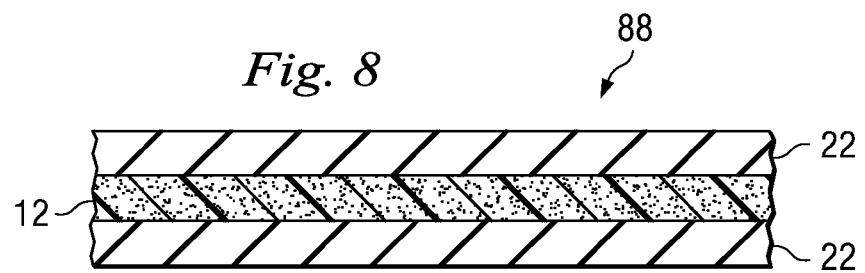
FIG. 8 illustrates a horizontal cross-sectional view of a shell subassembly created by a pre-polymer impregnation process.

After application of the curing initiator, the flexible material is passed through a roller system comprising an upper roller 64 and a lower roller 66, which can be equipped to apply a polyethylene sheet 22 to one or both of the upper and lower surfaces of the material to form a layered structure such as the one illustrated in FIG. 8. In certain embodiments, the polyethylene sheets applied to one or both of the upper and lower surfaces of the flexible material are from about 1 to about 3 mils thick.

The flexible material is then passed under a pressing roller 68, which applies sufficient pressure to the top side of the flexible material to establish a substantially uniform thickness of curable polymer compound across the width of the flexible material and to force the curable polymer compound to penetrate to the opposing planar surface of the flexible material from where the curable polymer compound was applied.

In certain embodiments, the spray nozzle application rate and ratios of curable polymer compound to additives are controlled by a computer 70. In certain embodiments, devices used in the process of applying curable polymer compound and other additives to the flexible material, such as dynamic weight scales 72, servo controlled motors 74, and flow valves 76, as well as the forces applied by the pressing roller 68 and the rate at which the flexible material is fed from roll 50 are monitored, managed and controlled by the computer 70.

Figure 7:
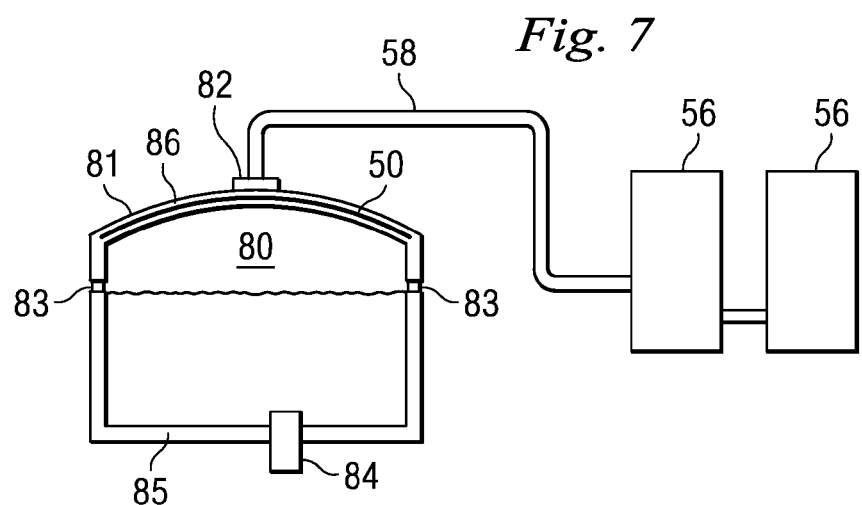
FIG. 7 illustrates a diagrammatical view of a vacuum impregnation process used in forming materials used in construction of the structure described herein.

In another embodiment, the curable polymer compound, other additives, and curing initiators can be applied to the flexible material by application of vacuum impregnation such as that illustrated diagramatically in FIG. 7. This process can be readily achieved by those skilled in the application of vacuum impregnation processes. Those of ordinary skill in the art will recognize that according to conventional vacuum impregnation techniques, the sheet of flexible material 50 is laid over a vacuum mold 80 and the vacuum mold 80 and flexible material are then covered with a flexible covering 81 comprising polypropylene or other suitable material, creating enclosed space 86. The flexible covering 81 has at least one inlet port 82 which is supplied with curable polymer compound and other additives or a curing initiator from tanks 56 by conduit 58. The extreme edge or underside of the vacuum mold 80 has vacuum ports 83 associated with conduits 85.

When a vacuum apparatus 84 is applied to the conduits 85 and curable polymer compound and other additives or a curing initiator is applied to the flexible material, the force of the vacuum pulls the curable polymer compound or other additive across the surface of the flexible material in enclosed space 86 and through the flexible material, thereby impregnating the flexible material with the curable polymer compound. Once the vacuum impregnation process is completed, the impregnated flexible material can be run through rolling operations similar to those described above to sandwich the impregnated flexible material between polyethylene sheets and to establish uniform distribution of the curable polymer compound within the flexible material.

Those of ordinary skill in the art will recognize that other methods for applying the curable polymer compound and other additives or a curing initiator to the flexible material, such as running the flexible material through a dip tank (wash tub) filled with the curable polymer compound, and then running the flexible material through the pressing roller 68, can also be used.

Figure 9:
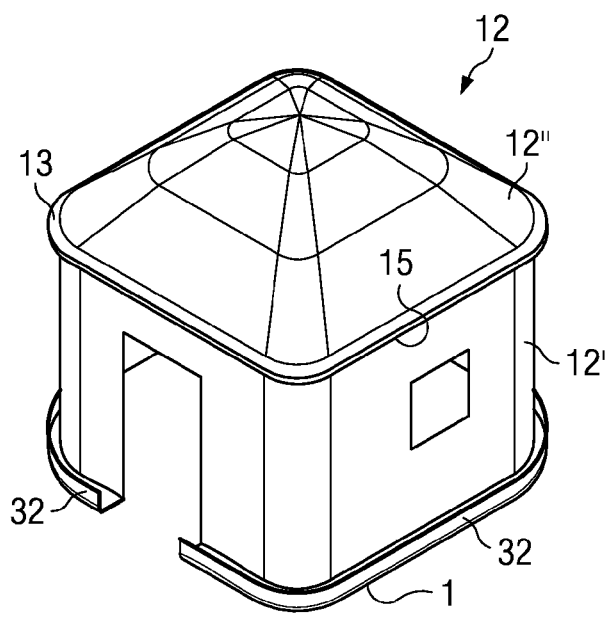
FIG. 9 illustrates a perspective view of the shell components of the walls and roof of the structure illustrated in FIG. 1.
Figure 10:
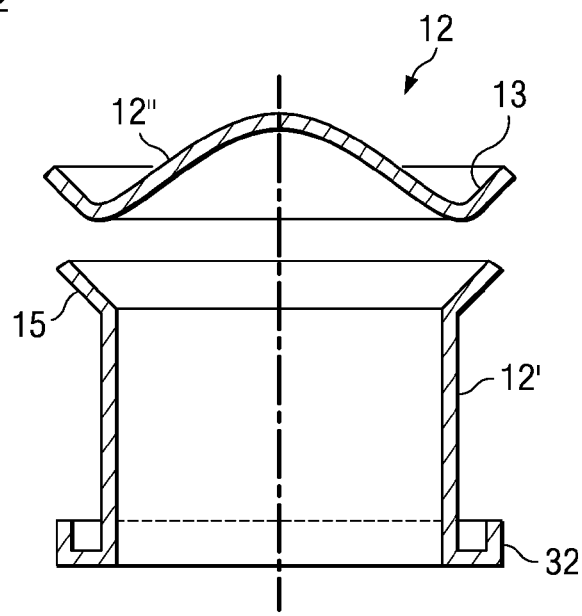
FIG. 10 illustrates a cross-sectional view of the components of the walls and roof of the structure illustrated in FIG. 1.

FIG. 8 illustrates a cross-section of the shell 12 of the embodiments of shelter 10 illustrated in FIGS. 1-3, as such cross-section of the shell 12 appears immediately following the treatment processes described above. The polyethylene sheets 22 are removed prior to assembly of the shelter 10. Shell 12 defines the interior of the shelter 10 and the basic geometry of the shelter 10, for example the interior of walls 36 and roof 38. As indicated by FIGS. 3, 4, and 9, the shell 12 can comprise a wall component 12' and a roof component 12" that can be joined to form shell 12.

The shell 12 comprises a material impregnated with a curable polymer compound. In certain embodiments, the shell material comprises polyester. In certain ones of such embodiments, the shell material is a polyester felt that is from about 0.06 to about 0.08 inches thick and about 8 oz./sq. yd. in weight. In some embodiments, the polyester felt comprising the shell material is from about 0.25 to about 0.50 inches thick, while in yet other embodiments, the polyester felt comprising the shell material is from about 12.5% to about 25% of the thickness of the inner core layer 14 (depicted in FIG. 2 and illustrated in FIGS. 3 and 4 and described in further detail herein). Because the shell 12 defines the interior of the shelter 10 and the basic geometry of the shelter 10, for example the interior of walls 36 and roof 38, the amount of the shell material used is determined by the desired size of the shelter 10 being constructed.

In certain embodiments, the shell material comprises a layer of polyester felt impregnated with a moisture-curable polyisocyanate polymer compound similar to those previously described herein via a treatment process such as one of those shown diagramatically in FIGS. 5-7 and described above. In some such embodiments, the curable polymer compound impregnated into the polyester felt comprises a mixture of about 75% of the Desmodur E 743 curable polymer compound described above and about 25% of the Desmodur E 28 curable polymer compound described above.

After application of the curable polymer compound, curing initiators are applied to the shell material as described above. After application of the curing initiators, the shell material is passed through the rolling operations described above and is sandwiched between two polyethylene sheets 22. The result of the treatment process is a layered shell structure 88 like that represented in FIG. 8, wherein the impregnated flexible material of shell 12 is effectively sandwiched between the polyethylene sheets 22. The polyethylene sheets 22 prevent exposure of the curable polymer compound to ambient moisture. In certain embodiments, the polyethylene sheets 22 applied to the upper and lower surfaces of the shell material are from about 1 to about 3 mils thick.

After the shell components 12' and 12" exit the pressing operation, they are placed into or onto a curing fixture 21 that maintains the shell 12 in the shape desired for shelter 10, and the curable polymer compound impregnated into the flexible shell material is allowed to cure. FIG. 11 shows an exploded view of the curing fixture 21 and the shell components 12' and 12" during the curing process of the shell 12. In the embodiment illustrated in FIG. 11, the shell components 12' and 12" are applied to the exterior of the curing fixture 21 while the curable polymer compound cures. Curing of the pre-polymer in the shell material proceeds despite the presence of the polyethylene sheets 22 because of the curing initiators applied to the shell material during the impregnation process. In certain embodiments, the polyethylene sheets 22 could be removed from the shell material, and the curable polymer compound therein could cure by exposure to ambient moisture in addition to or in place of the curing initiators.

Still referring to FIG. 11, some embodiments of the curing fixture 21 will also have a lip 23, which will cause the formation of a lip 13 on the shell component 12", a lip 25, which will cause the formation of a lip 15 on the shell component 12', and a lip 27, which will cause the formation of a lip 32 on the shell component 12'.

Figure 12:
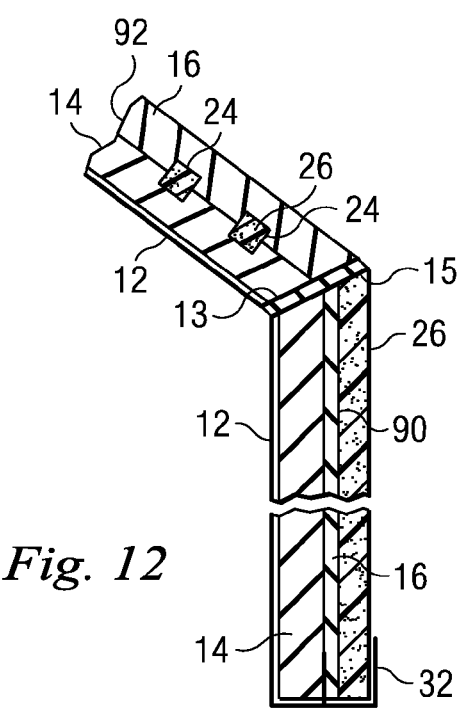
FIG. 12 illustrates a vertical cross-sectional view of the subassembly of the structure illustrated in FIG. 1 consisting of the shell, a wall core, and a roof core.

The lip 13 is formed around the bottom edge circumference of the shell component 12' and extends somewhat radially from the surface plane of the shell component 12". The lip 15 is formed around the top edge circumference of the shell component 12' and extends outward from the exterior surface of the shell component 12' at an angle such that the topmost surface of the lip 15 is flush with the bottom surface of the lip 13 when the shell components 12' and 12" are assembled as shown in FIG. 12. The lip 32 is formed around the bottom edge circumference of the shell component 12' and extends radially from the bottom of shell component 12' and then upward as shown in FIGS. 1 and 9-12.

Referring now to FIGS. 1, 2, and 12-14, the walls 36 and the roof 38 of the shelter 10 each have a wall core 90 and a roof core 92, respectively, which provide the interior framework of the shelter 10. The wall core 90 and the roof core 92 each have a plurality of layers, which are described below with reference to FIGS. 2-4 and 12-14, wherein reference to an "inner" layer describes a layer that is adjacent to the exterior surface of the shell 12 and forms an interior side of a core, and reference to an "outer" layer describes a layer that is distal from the exterior surface of the shell 12 and forms an exterior side of a core.

Each of wall core 90 and roof core 92 have an inner core layer 14 made of flexible material and an outer core layer 16 made of flexible material. In certain embodiments, each of inner core layer 14 and outer core layer 16 comprises an open-cell, polyether, polyester or polyurethane foam that is at least about 1 inch thick. In still other embodiments, each of inner core layer 14 and outer core layer 16 comprises an open-cell, polyether, polyester or polyurethane foam having an indentation load deflection (ILD) range of from about 0.6 to about 1.2 pounds, and a density range of from about 1.5 to about 4 lb/ft$^3$.

The relative sizes of the inner core layers 14 and the outer core layers 16 are determined at least in part by the desired area of the structure to be formed. In certain embodiments where the structure to be formed is a shelter 10, the inner core layers 14 and the outer layers 16 each have a horizontal dimension (relative to the surface 1 on which the shelter 10 is erected), "h" (i.e., a length) determined at least in part by the outer circumference of the shelter being constructed. The respective lengths of the inner core layer 14 and the outer core layer 16 are further determined by whether the layer is to be an inner core layer 14 or an outer core layer 16. In particular, the inner core layers 14 have a shorter length as compared to the outer core layers 16.

The length of the inner core layer 14 of the wall core 90 is equal to about 98% of the desired outer circumference of the shelter 10. The length of the outer core layer 16 of wall core 90 is equal to about 101% of the desired outer circumference for the shelter. The surface area of the inner core layer 14 of the roof core 92 is equal to about 98% of the desired outer surface area of the shelter. The surface area of the outer core layer 16 of the roof core 92 is equal to about 101% of the desired outer surface area of the shelter. The dimensions of the inner core layers 14 and outer core layers 16 are adjusted to compensate for geometric factors, encountered during assembly of the wall core 90 and the roof core 92, that will be described in further detail herein.

By forming the wall core 90 and the roof core 92 with inner and outer core layers 14 and 16 having the relative sizes described above, the wall core 90 and the roof core 92 so formed will have a bowed and concave shape, respectively, as demonstrated in FIGS. 1, 3, and 4, which contributes to the ability of the layers to stand erect. The ability to stand erect rather than bending or collapsing is particularly relevant to the wall core 90 and the roof core 92, as each provides the interior framework for the shelter 10.

In certain embodiments, one or both of the inner core layer 14 and the outer core layer 16 of one or both of the wall core 90 and the roof core 92 can be impregnated with a moisture-curable polyisocyanate polymer compound similar to those previously described herein. Impregnation, if any, of the inner core layers 14 or the outer core layers 16 with a curable polymer compound can be accomplished by brushing or spraying the curable polymer compound on the inner surface of the inner core layer 14 and the outer surface of the outer core layer 16 after the inner and outer core layers 14 and 16 have been physically associated (as is described in further detail herein).

If either of the inner and outer core layers 14 and 16 is impregnated with a curable polymer compound, curing initiators are preferably not applied and curing of the curable polymer compound is delayed by applying polyethylene sheets to the impregnated layer(s) to sandwich the impregnated material, much like the shell 12 is sandwiched between two polyethylene sheets 22 as described in connection with FIG. 8. The polyethylene sheets 22 can be removed when it is time to physically associate the wall core 90 and the roof core 92 with other layers of the shelter 10.

The shelter 10 further comprises a moisture barrier 18, depicted in FIG. 2 and illustrated in FIGS. 3 and 4. The moisture barrier 18 serves to shield all layers of the shelter 10 that are interior to the moisture barrier 18 from intrusion by the elements. The dimensions of the moisture barrier 18 are determined in a manner similar to that used to determine the dimensions of the outer layer 16 described above, taking into account any increase in the surface area of shelter 10 caused by layers that are interior to the moisture barrier 18.

In certain embodiments, the moisture barrier 18 may be comprised of a double sided adhesive film roughly 1-10 mils thick with a core of polyethylene or other water resistant material. Any of a wide variety of commercially available double sided adhesive films or tapes that meet these criteria are suitable for use as a moisture barrier 18.

If the moisture barrier 18 is not a double sided adhesive film or similar material, the inner surface of the moisture barrier may be coated with a curable polymer compound, for example a moisture curable polyisocyanate polymer compound similar to those previously described herein, via a treatment process such as one of those shown schematically in FIGS. 5-7 and described above.

In some such embodiments, the moisture barrier 18 comprises kraft paper. In such embodiments, the kraft paper has a weight of from about 30 lbs. to about 40 lbs., and is about 0.01 inches thick. In other embodiments, the moisture barrier 18 comprises a polyester felt that is from about 0.06 inches to about 0.08 inches thick and about 8 oz./sq. yd. in weight.

The inner surface of the moisture barrier 18 can be coated with a first layer of curable polymer compound that is from about 0.005 to about 0.010 inches thick. In one embodiment, polyethylene sheets are applied to the moisture barrier 18 after application of the curable polymer compound for ease of handling. Curing initiators may also be applied if polyethylene sheets are to be applied to the moisture barrier 18. If polyethylene sheets are not used, then the curable polymer compound in the moisture barrier 18 can be allowed to cure upon contact with ambient moisture.

Regardless of whether curing initiators and polyethylene sheets are used, the first layer of curable polymer compound on the moisture barrier 18 is allowed to cure. A second layer of the curable polymer compound can then be applied. The second layer of curable polymer compound can be brushed, sprayed, or rolled onto the first layer of cured polymer compound. In certain embodiments, a second layer of curable polymer compound is applied to the inner surface of the moisture barrier 18 in a layer about 0.05 inches thick.

As shown in FIG. 15, if the moisture barrier 18 comprises kraft paper, the curing process occurring in the moisture barrier 18, as well as the adhesion of the moisture barrier 18 to interior layers of the shelter 10, can be accelerated through the application of steam 120 to the outer surface of the moisture barrier 18 by steaming apparatus 122. Steaming apparatus 122 can be any industrial device equipped to generate water vapor for application to commercial materials. Water vapor in the steam 120 penetrates the moisture barrier 18, accelerating the curing process and encouraging the curable polymer compound to foam, which assists the formation of a permanent flexible bond between the moisture barrier 18 and the wall core 90, the roof core 92, and the outer-most surface of lip 32 of shell 12. Pressure 124 can also be applied from the interior surface of the shell 12 to assist the penetration of the foaming curable polymer compound into the wall core 90 or roof core 92. Other curing initiators, such as that previously described herein, may be deployed to foster the foaming of the curable polymer compound.

Shelter covering 20, represented in FIG. 2 and illustrated in FIGS. 1, 3, and 4, serves as the outermost layer of the shelter 10. The dimensions of the shelter covering 20 are determined in a manner similar to that used to determine the dimensions of the outer layer 16 described above, taking into account any increase in shelter 10 surface area caused by layers that are interior to the shelter covering 20. In most embodiments, the shelter covering 20 is of sufficient size to wrap around the outer surface of the moisture barrier 18 as a continuous sheet.

In certain embodiments, shelter covering 20 comprises a polyester felt that has been impregnated with a curable polymer compound. In other embodiments, shelter covering 20 comprises a 95% wool felt (for example, ASTM Number CF-206-16R1x, 600 PSI or greater), that is from about 0.06 inches to about 0.08 inches thick.

In certain embodiments, the shelter covering 20 is impregnated with a moisture-curable polyisocyanate polymer compound similar to those previously described herein. In some such embodiments, the moisture-curable polymer compound impregnated into the polyester felt is a mixture of about 25% of the Desmodur E 743 polymer compound described above and about 75% of the Desmodur E 28 polymer compound described above.

In embodiments in which the shelter covering 20 is impregnated with a curable polymer compound, the moisture content of the shelter covering material must be below about 0.0001 part moisture per 10 parts of curable polymer compound in order for the curable polymer compound to be adequately impregnated therein. Prior to impregnation with the curable polymer compound, the shelter covering 20 can be dried to remove ambient moisture.

Impregnation of the shelter covering 20 with a curable polymer compound can be performed by hand or by a treatment process such as one of those shown schematically in FIGS. 5-7 and described above. However, curing initiators are not applied to the shelter covering 20, as it is intended to delay curing of the curable polymer compound in the shelter covering until such time as final assembly of the shelter 10 is desired. This delay in curing is accomplished by applying polyethylene sheets to the shelter covering 20 during the treatment process.

The shelter 10 further comprises support members 26, which are represented in FIG. 2 and illustrated in FIGS. 3, 4, and 12-14. The support members 26 largely provide the previously described wall core 90 and roof core 92 with the ability to stand erect. As demonstrated in FIGS. 12-14, support members 26 can be disposed in slots 24 made in either the outer core layer 16 of one or both of the wall core 90 and the roof core 92 or the inner core layer 14 of one or both of the wall core 90 and the roof core 92.

In certain embodiments, the support members 26 can be constructed using conventional materials well-known to those of ordinary skill in the art, such as polyvinyl chloride piping or plastic or aluminum tubing or rods.

In certain other embodiments, the support members 26 comprise a polyester felt having a thickness of about 75% of the thickness of the outer core layer 16. In such embodiments, the material of the support member 26 can be impregnated with a moisture-curable polyisocyanate polymer compound similar to those previously described herein.

In some embodiments, the support members 26 reinforcing the roof core 92 comprise a flexible material, an open cell, polyether, polyester, or polyurethane foam, roughly equal to 100% of the inner core 14 thickness and from about 4 inches to about 8 inches wide, that is impregnated with a moisture-curable polyisocyanate polymer compound similar to those previously described herein.

In some embodiments in which the support members 26 associated with the wall core 90 are impregnated with a moisture-curable polyisocyanate polymer compound similar to those previously described herein, the curable polymer compound impregnated into the material of the support member 26 generally comprises only the Desmodur E 743 polymer compound described above.

In some embodiments in which the support members 26 associated with roof core 92 are impregnated with a moisture-curable polyisocyanate polymer compound similar to those previously described herein, the curable polymer compound impregnated into the material of the support member 26 comprises a mixture of about 50% of the Desmodur E 743 polymer compound described above and about 50% of the Desmodur E 28 polymer compound described above.

If the support members 26 of either the wall core 90 or the roof core 92 are impregnated with a curable polymer compound by the treatment process described above, curing initiators are preferably not applied, and curing of the curable polymer compound is delayed until the polyethylene sheets that are applied following the impregnation process are removed. The delay in curing of the curable polymer compound in support members 26 provides time for application of the support members 26 to the wall core 90 and/or the roof core 92 (described in further detail herein).

Referring now to FIGS. 1-3 and 16-18, a capture system 110 for securing a shelter 10 to a surface 11 is illustrated. Capture system 110 comprises a continuous or individual capture members 28, which provide attachment points for anchoring the shelter 10 to the surface 11, and capture nodes 180, which protrude through the interior surface of the shell 12 and provide attachment points for adding elements or additional fixtures, such as internal screens, to the interior or exterior of the shelter 10.

In certain embodiments, capture member(s) 28 comprise about 0.10-inch diameter stainless steel cables, which terminate in looped ends 112 (FIG. 17). In certain other embodiments, capture member(s) 28 comprise about 0.10-inch-0.25-inch diameter cords, made of nylon, braided or unbraided cloth rope or other suitable and commercially available materials, that terminate in looped ends 112.

In certain embodiments, capture member(s) 28 are jacketed in a flexible sheath 114 (shown in FIG. 16) to prevent the capture member(s) 28 from cutting into adjacent layers of the structure. In some such embodiments, to prevent cutting into adjacent layers of the structure, the path of each capture member 28 on the wall core 90 and roof core 92 is lined with a reinforcing material layer 116 (shown in FIG. 16), which in certain of those embodiments is impregnated with a moisture-curable polyisocyanate polymer compound similar to those previously described herein.

Figure 19:
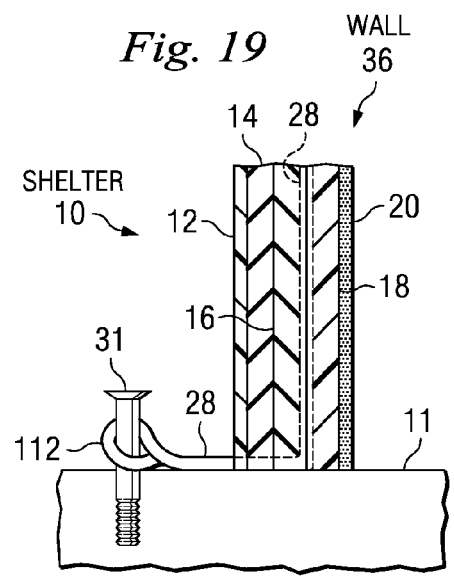
FIG. 19 illustrates a vertical cross-sectional view of an embodiment of the capture system illustrated in FIG. 16.

Capture member(s) 28 accommodates attachments to many conventional anchoring devices and mechanisms. As illustrated in FIG. 19, such attachments could include a ground anchor 31, such as a ground stake or auger screw that can receive looped end 112. Other anchoring embodiments include a turnbuckle 33 disposed between the anchor 31 and the capture member 28 to facilitate initial and periodic adjustments, as illustrated in FIG. 20.

Figure 18:
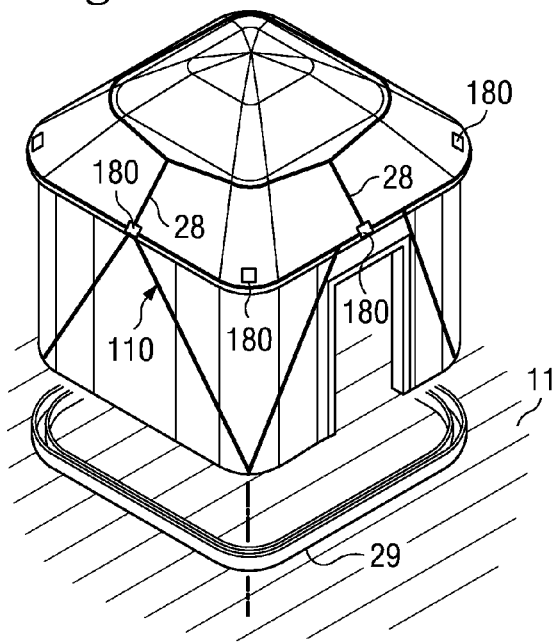
FIG. 18 illustrates an example layout for a capture system for securing the structure illustrated in FIG. 1 to a surface.
Figure 21:
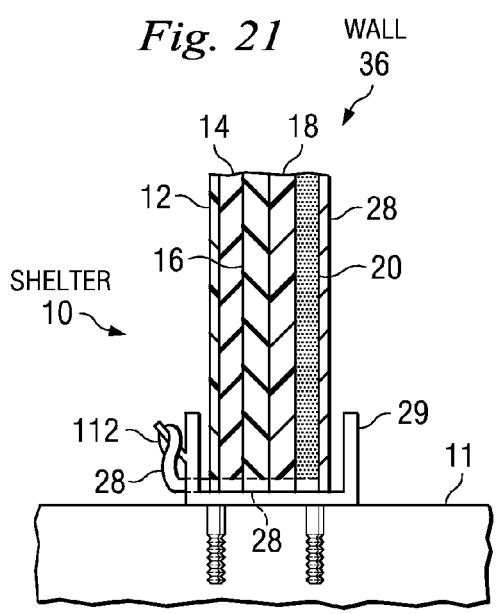
FIG. 21 illustrates a vertical cross-sectional view of an embodiment of the capture system illustrated in FIG. 16.

In another anchoring embodiment, such as that illustrated by FIGS. 18 and 21, a mounting rail 29 made from rigid materials such as plastics or metals (aluminum, for example) and shaped to accept the base geometry of the shelter 10 can be anchored directly to the surface 11 on which the shelter is erected, and the shelter 10 can be secured to the mounting rail 29 using the capture system 110.

Figure 20:
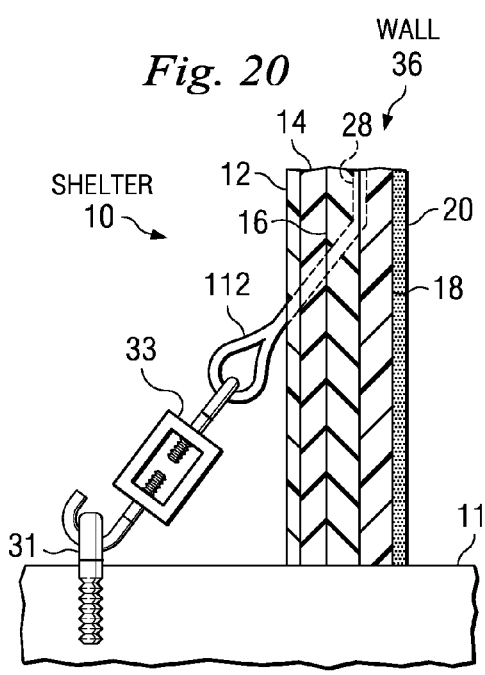
FIG. 20 illustrates a vertical cross-sectional view of an embodiment of the capture system illustrated in FIG. 16.

Regardless of the type of anchoring mechanism or the exact placement of capture member(s) 28 within the structure of walls 36, looped ends 112 are biased toward the interior of the shelter 10 in some way, such as in the embodiments illustrated by FIGS. 19-21, so that anchoring of the shelter 10 to a surface 11 can be performed from inside the shelter 10.

Referring back to FIG. 1, the shelter 10 further comprises roof-to-wall seam 30, which protects the joint between the roof 38 and walls 36 and ensures that there is no gap in the coverage provided by the shelter covering 20. The roof-to-wall seam 30 is sized to be long enough to wrap along the entire top edge circumference of the walls 36 of shelter 10 and wide enough to extend from about 4 inches to about 6 inches down the exterior of walls 36 of the shelter 10 and from about 4 inches to about 6 inches up the exterior of roof 38 of the shelter 10.

In certain embodiments, roof-to-wall seam 30 comprises a felt strip that has been impregnated with a curable polymer compound that is a moisture curable polyisocyanate polymer compound similar to those previously described herein. In some such embodiments, roof-to-wall seam 30 comprises a 95% wool felt (for example, ASTM Number CF-206-16R1x, 600 PSI or greater) that is from about 0.06 inches to about 0.08 inches thick and impregnated with the curable polymer compound.

Impregnation of the roof-to-wall seam 30 with a curable polymer compound can be accomplished by a treatment process such as one of those shown schematically in FIGS. 5-7 and described above, with the intention to delay curing of the curable polymer compound in the shelter covering until such time as final assembly of the shelter 10 is desired. Thus, curing initiators are not applied and when the roof-to-wall seam 30 exits the rolling operations it is covered on both surfaces by polyethylene sheets.

Referring again to FIG. 1, in some embodiments a lower edge flap 34 is applied to the bottom edge circumference of the walls 36. In those embodiments, the lower edge flap 34 is sized to be long enough to wrap around the entire circumference of the shelter and wide enough to extend from the exterior of the shelter covering 20 to the interior of the shell 12 with an overlap on the interior of the shell 12 and the exterior of the shelter covering 20 of at least 3 inches in a vertical direction with respect to the surface 11 on which the shelter 10 will be grounded. Additionally, the length of lower edge flap 34 includes the height and width of any door openings, and follows the geometries of any such openings.

In certain of those embodiments, lower edge flap 34 comprises a 95% wool felt (for example, ASTM Number CF-206-16R1x, 600 PSI or greater), that is from about 0.06 inches to about 0.08 inches thick.

In certain embodiments, the lower edge flap 34 is impregnated with a curable polymer compound similar to that applied to shelter covering 20 as described above, and will adhere to the exterior of the shelter covering 20 or the shell 12 if applied to the surface of either layer before appreciable curing of the curable polymer compound impregnated into lower edge flap 34 occurs.

In those embodiments in which the lower edge flap 34 is impregnated with a curable polymer compound, the intention is to delay curing of the curable polymer compound in the shelter covering until such time as final assembly of the shelter 10 is desired. Thus, curing initiators are not applied, and lower edge flap 34 is sandwiched between polyethylene sheets until assembly occurs unless, as described below, the intention is to have the curable polymer compound that is applied to the lower edge flap 34 serve as an adhesive.

Referring back to FIGS. 8-10, the first step in assembling the shelter 10 is assembling a single-piece shell 12. The application of curing initiators to the shell material will allow for curing of the curable polymer compound impregnated in the shell 12 prior to assembly despite the presence of the polyethylene sheets 22, which at this point are present for ease of handling of the shell 12.

Referring also to FIGS. 3, 4, and 9, the wall and roof components of the shell 12 are assembled so that the concavity of the shell components 12" forms a continuous space with the interior of the shell component 12'. The shell components 12' and 12" are then adhered or otherwise secured to one another.

In some embodiments, the portions of the polyethylene sheets covering the top surface of lip 15 and the bottom surface of lip 13 are removed when shell components 12' and 12", respectively, are applied to the curing fixture 21. In some such embodiments, the shell components 12' and 12" can be brought into contact prior to any appreciable curing of the curable polymer compound so that the curable polymer compound acts as an adhesive and secures the two components of the shell 12 when cured.

In other embodiments, the shell components 12' and 12" of the shell 12 are allowed to substantially cure before being joined and, after the polyethylene sheets 22 are removed, are later secured using a polyurethane adhesive or another suitable material well-known to those of ordinary skill in the art. In addition, the shell components 12' and 12" of the shell 12 can be joined by mechanical fastening such as by stapling or stitching or other means well-known to those of ordinary skill in the art.

Referring back to FIG. 1, prior to physically associating the wall core 90 and roof core 92 with a cured shell 12, an optional lower edge flap 34 (described above) can be attached to the lower interior edge of the cured shell 12. In such embodiments, the polyethylene covering the portion of the lower edge flap 34 to be attached to the lower interior edge of the cured shell 12 is removed. The lower edge flap 34 is then either immediately applied to the shell 12, so that the curable polymer compound with which the lower edge flap 34 is impregnated functions as an adhesive as it cures, or the exposed section of the lower edge flap 34 is allowed to cure and later adhered to the shell 12. The free end of lower edge flap 34 can then be projected outward, underneath and beyond the wall 36 to close the gap between the bottom of the shelter 10 and the surface on which it is mounted. For example, the lower edge flap 34 will provide the shelter with resistance to the entry of weather and pests, particularly if the lower edge flap 34 is covered with dirt or other materials.

FIG. 13 illustrates an embodiment of wall core 90, described above, which is formed by stretching an inner core layer 14 to dimensions equal to those of an outer core layer 16, so that the inner core layer 14 generally overlaps the outer core layer 16, and adhering the two layers together at their respective ends. Next, the inner core layer 14 and the outer core layer 16 are adhered in their respective centers, then at each successive mid-point of the resulting structure until the entirety of the inner and outer core layers 14 and 16 are mated together. Because the inner core layer 14 is stretched to overlap the outer core layer 16 and will subsequently attempt to shrink back to its original dimensions, adhesion in this manner contributes to a concave curling of the wall core 90 with respect to the interior of the shelter. This concave curling provides structural support in the form of vertical rigidity and lateral resistance from interior and exterior forces.

Figure 22:
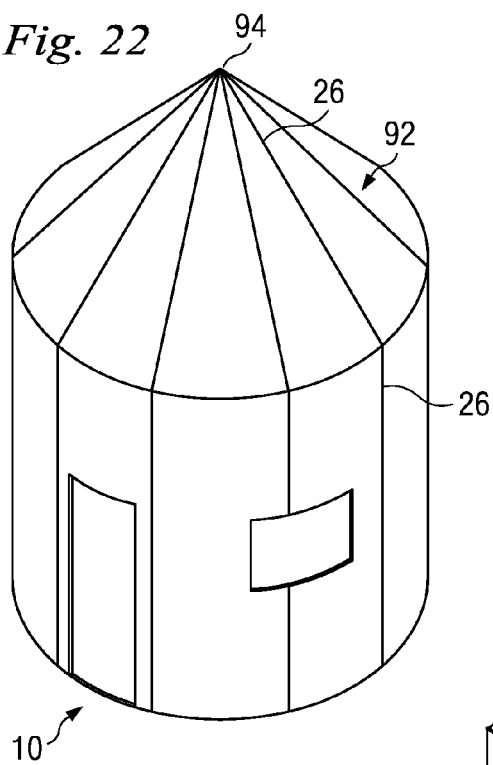
FIG. 22 illustrates a perspective view of an embodiment of the structure illustrated in FIG. 1 wherein the roof of the structure forms a conical point.
Figure 23:
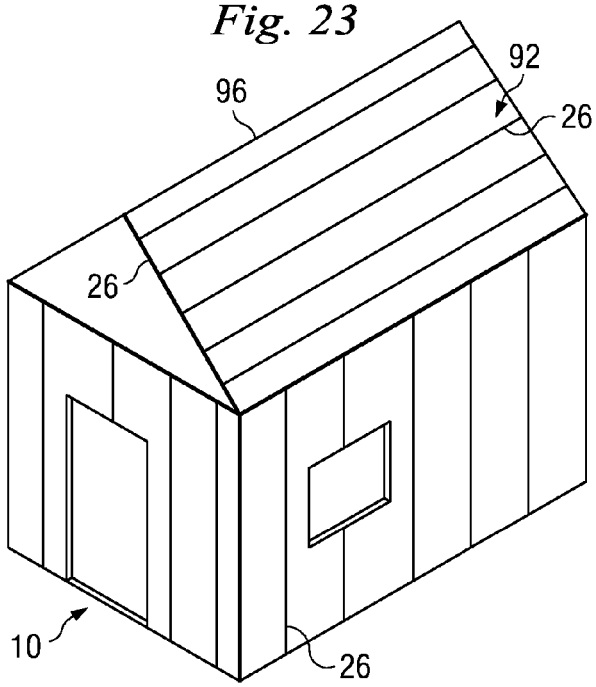
FIG. 23 illustrates a perspective view of an embodiment of the structure illustrated in FIG. 1 wherein the roof of the structure forms a ridgeline.
Figure 24:
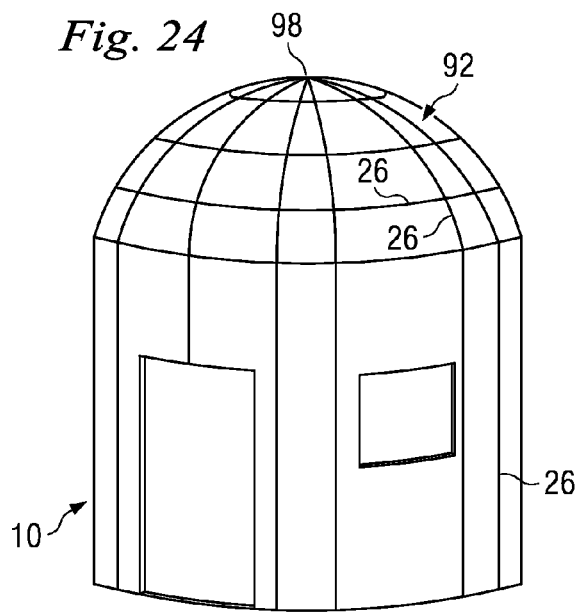
FIG. 24 illustrates a perspective view of an embodiment of the structure illustrated in FIG. 1 wherein the roof of the structure forms a dome.

FIG. 14 illustrates an embodiment of roof core 92, described above, which is formed by reinforcing an inner core layer 14 with at least one support member 26 (described above), stretching the inner core layer 14 to generally overlap an outer core layer 16, and, as shown in FIGS. 22-24, respectively, adhering the two layers together at the conical center 94, ridgeline 96, or peak 98 of the roof 38, depending on the embodiment of the shelter 10. In an alternative embodiment of roof core 92, the at least one support member 26 is applied to the exterior of outer core layer 16 rather than being sandwiched between the inner and outer core layers 14 and 16.

The inner and outer core layers 14 and 16 are further adhered together at the edges around the perimeter of the roof core 92, then at each successive mid-point of the resulting structure until the entirety of the inner and outer core layers 14 and 16 are mated together. In embodiments where the roof core 92 is substantially dome-shaped (FIG. 24), adhesion in this manner contributes to a convex curling of the roof core 92 with respect to the interior of the shelter 10, which provides structural stability and rigidity perpendicular to the shell 12 component of the roof 38.

Adhesion of the inner core layers 14 and the outer core layers 16 of one or both of the wall core 90 and the roof core 92 is achieved by the application of a polyurethane adhesive or double sided adhesive tapes or films. Any of a wide variety of commercially available polyurethane adhesives or double sided tapes are suitable for this purpose.

As described above with respect to roof core 92, support members 26 can be placed between the inner and outer core layers 14 and 16 or exterior to the outer core layer 16 to further provide the wall core 90 and roof core 92 with the ability to stand erect. While in most embodiments the support members 26 associated with wall core 90 will be oriented in a generally vertical direction with respect to the surface on which the shelter is erected, the orientation of the support members 26 associated with roof core 92 can vary.

FIG. 22 illustrates an embodiment of the arrangement of the support members 26 of the shelter 10 in which the roof core 92 forms a conical shape and the support members 26 are positioned in a generally vertical direction on wall core 90 and co-planar with the surface of the roof core 92. In such an embodiment, the support members 26 associated with the roof core 92 are positioned around the perimeter of the roof core 92 and connected to one another at the center of the roof core 92.

FIG. 23 illustrates an embodiment in which the roof core 92 forms a gable or pitched roof and the support members 26 are positioned in a generally vertical direction on wall core 90 and in a generally horizontal direction on roof core 92. In such an embodiment, some of the support members 26 are positioned horizontally with respect to the load bearing orientation of the roof core 92 while others are positioned at an angle to provide additional stability to the roof core 92.

FIG. 24 illustrates an embodiment in which the shelter requires additional load-bearing capabilities of the roof core 92, and the support members 26 are positioned both horizontally and vertically in a dome configuration to maximize the stability and strength of the structure. In such an embodiment, the generally vertical support members 26 are positioned around the perimeter of the roof core 92 and connected to one another at the center of roof core 92.

Referring more specifically to the method used to place the support members 26 with respect to the inner and outer layers 14 and 16, slots 24 can be made in the interior or exterior surface of the outer core layer 16 and the exterior surface of inner core layer 14 of the wall core 90 or roof core 92 to receive support members 26 as illustrated in FIGS. 2, 13, and 14.

In certain embodiments, the slots 24 are made in the outer core layers 16 after the adhesion of the inner and outer core layers 14 and 16. In some such embodiments, the slots have a depth of about 75% of the thickness of the outer core layer 16 for the wall core 90, and about 100% of the thickness of the inner core layer 14 for the roof core 92. For the wall core 90, the slots 24 are located so as to receive support members 26 at about 5-inch to about 24-inch intervals, the support members 26 being spaced laterally and positioned generally vertical with respect to the surface on which the shelter is to be erected.

For a roof core 92 that forms a conical or domed shape, such as those shown in FIGS. 22 and 24, respectively, the slots 24 are cut at evenly spaced intervals around the perimeter of the roof core 92 and the support members 26 are positioned generally coplanar with the surface of roof core 92 and connected at the roof's conical center 92 or peak 98. In embodiments having an increased load-bearing capability, such as that illustrated by FIG. 24, slots 24 are also made horizontal to the load-bearing orientation of the roof to receive support members 26 spaced longitudinally in intervals similar to those described below with respect to gable or pitched roofs (FIG. 23).

For a roof core 92 that is to form a gable or pitched roof, the slots 24 are made horizontal to the load-bearing orientation of the roof core 92 so as to receive support members 26 at about 5-inch to about 10-inch intervals.

In some embodiments, as described above, the support members 26 are impregnated with a as shown in FIGS. 22-24, respectively during their manufacture. In such embodiments, the support members 26 are stripped of any polyethylene sheets attached thereto and inserted into the slots 24 before the as shown in FIGS. 22-24, respectively in the support members 26 has undergone appreciable curing.

The next stage in assembly of the shelter 10 is association of the wall core 90, the roof core 92, and the support members 26 with the shell 12. As shown in FIG. 12, the bottom edges of the wall core 90 and its support members 26 are inserted into the gap between the lower edge of the shell 12 and the vertical portion of lip 32 and adhered to the internal surfaces of the lip 32. The interior surface of the inner core layer 14 of the wall core 90 is adhered to the exterior surface of the shell 12 and the top surfaces of the inner and outer core layers 14 and 16 of the wall core 90 are adhered to the bottom surface of lip 15.

The bottom surfaces of the inner core layer 14 and the outer core layer 16 of roof core 92 are adhered to the top surface of lip 13 by any suitable adhesive such as a polyurethane adhesive or a double-sided tape. The interior surface of the inner core layer 14 of the roof core 92 is adhered to the exterior surface of the shell 12. The adhesion of the wall core 90 and the roof core 92 to the exterior surfaces of shell 12 can be accomplished using any suitable adhesive such as a polyurethane adhesive or a double-sided tape.

Once the shell 12, wall core 90, roof core 92, and support members 26 are associated, a subassembly 100 (shown in FIG. 25) of the shelter is complete. FIG. 26 illustrates a horizontal cross-section of an embodiment of subassembly 100 and depicts the shell 12, the wall core 90, the roof core 92, the slots 24 and the support members 26. In some embodiments, the subassembly 100 includes features such as lower edge flap 34 and optional fixtures such as window unit 40. In all embodiments, the wall core 90 and the roof core 92 of the subassembly 100 each comprise their respective inner core layers 14, outer core layers 16, slots 24 and support members 26.

Referring now to FIG. 18, the layout of a capture system 110 (previously described) applied to subassembly 100 is illustrated. Capture system 110 comprises a continuous or individual capture members 28, which are located on the outer surface of the wall core 90 and roof core 92 in the illustrated embodiment.

In some embodiments, regardless of the exact placement of capture member(s) 28 within the structure of wall 36, looped ends 112 are biased toward the interior of the shelter 10 in some way, as illustrated in FIGS. 19-21, so that anchoring of the shelter 10 to a surface can be done from inside of the shelter.

In certain embodiments, such as that shown in FIG. 18, capture member(s) 28 are arranged in a path on the outer surface of the wall core 90 and roof core 92 that provides anchoring at the general location of the four corners and on the sides of the shelter 10.

In alternate embodiments, a mounting rail (shown in FIGS. 18 and 21) made from rigid materials such as plastics or metals (aluminum, for example) and shaped to accept the base geometry of the shelter 10 can be anchored directly to the surface 11 on which the structure is erected, and the structure can be secured to the mounting rail 29 using the capture system 110.

Figure 27:
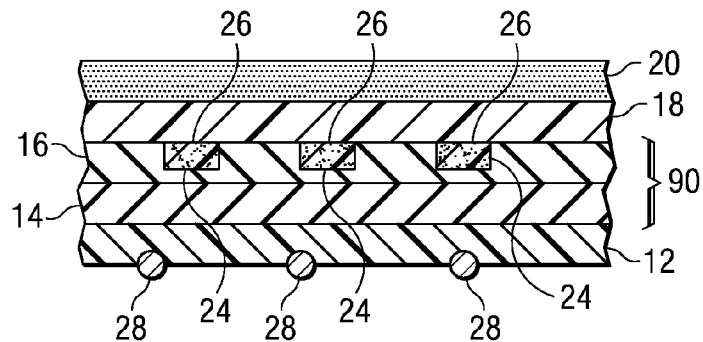
FIG. 27 illustrates a cross-sectional view of an embodiment of the structure illustrated in FIG. 1 wherein the capture members are disposed interior to the shell of the structure.
Figure 28:
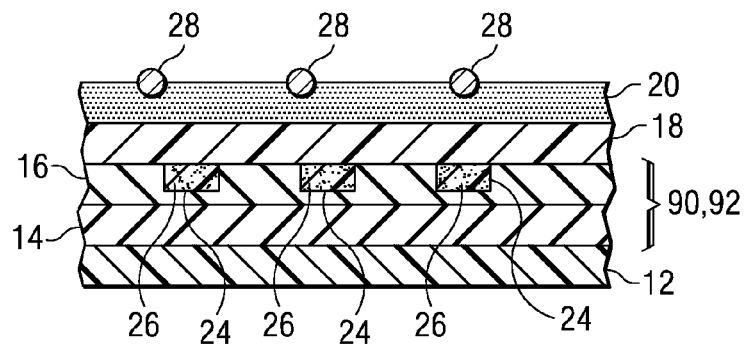
FIG. 28 illustrates a cross-sectional view of an embodiment of the structure illustrated in FIG. 1 wherein the capture members are disposed exterior to the shelter covering of the structure.

Although the cross-section of an embodiment illustrated in FIG. 2 shows capture members 28 of the capture system 110 located adjacent and exterior to an outer core layer 16, in alternative embodiments, the components of the capture system 110 could be placed adjacent to any layer of the shelter 10, including for example interior to the shell 12 or exterior to the shelter cover 20 as shown in FIGS. 27 and 28, respectively.

Figure 25:
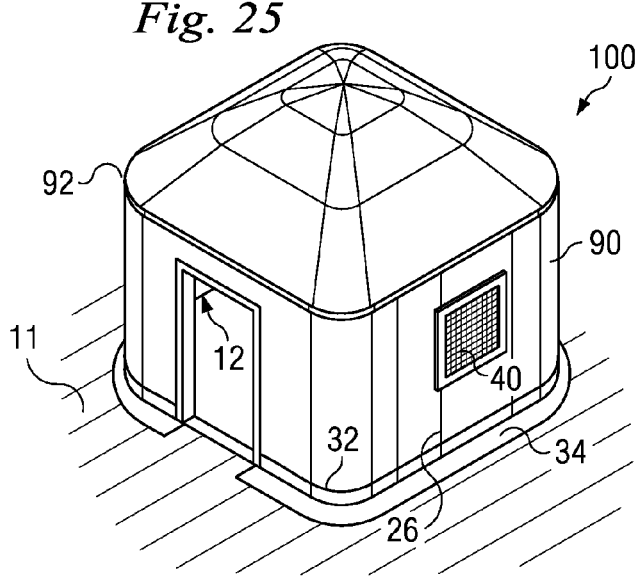
FIG. 25 illustrates a perspective view of a subassembly of the structure illustrated in FIG. 1.
Figure 26:
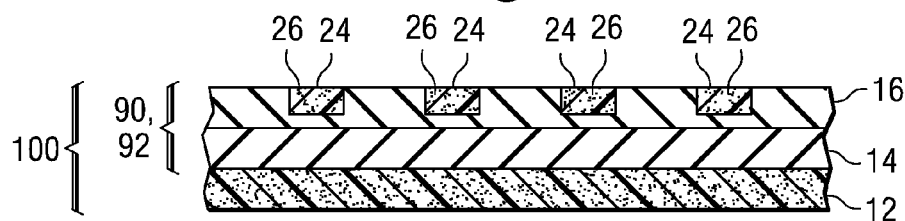
FIG. 26 illustrates a cross-sectional view of a subassembly of the structure illustrated in FIG. 25.

Once the subassembly 100 is completed, a moisture barrier 18 (described above) is applied to the exterior of the subassembly 100 illustrated in FIGS. 25 and 26. In some embodiments, such as the one represented in the cross-section illustrated in FIG. 29, the capture system is located adjacent to the outer core layer 16 and the moisture barrier 18 covers the capture members 28 of capture system 110. As noted in FIG. 29, the application of moisture barrier 18 to the exterior surface of the outer core layer 16 of subassembly 100 creates subassembly 102.

In embodiments in which the moisture barrier has been impregnated with a curable polymer solutions and sandwiched between polyethylene sheets, the polyethylene sheets are removed from the moisture barrier 18 prior to adhering the moisture barrier 18 to the outer core layer 16 of subassembly 100. The adhesion of the moisture barrier 18 to the exterior surfaces of outer core layer 16 and the outer-most surface of lip 32 of shell 12 can be accomplished using any suitable adhesive such as a polyurethane adhesive or a double-sided tape.

The subassembly 102 is allowed to at least substantially cure. For example, the subassembly 102 can be left to stand for about 2 to about 4 hours to allow time for the curable polymer solutions impregnated into the materials of the subassembly 102 to cure. It is not necessary for the subassembly to completely cure, but it should be cured an amount sufficient to allow for handling.

After all curable polymer solutions contained in the subassembly 102 have cured, the subassembly 102 is dried to remove ambient moisture and any moisture developed during any process previously performed on the layers of subassembly 102. Additionally, drying ensures that the curing of all previously applied curable polymer solution is halted.

The subassembly 102 is dried to a point where the moisture content within the inner and outer core layers 14 and 16 of the wall core 90 and the roof core 92 is below about 0.0001 part moisture per 10 parts of curable polymer solution that will be applied to a shelter covering that will be applied to the exterior surface of the moisture barrier 18. The moisture content within the inner and outer core layers 14 and 16 of the wall core 90 and roof core 92 can be determined using commercially available moisture content meters such as General Electric's Protimeter MMS Plus (GE5800) or Electromatic Equipment Company, Inc.'s TEM-1 Textile Moisture Meter.

Figure 29:
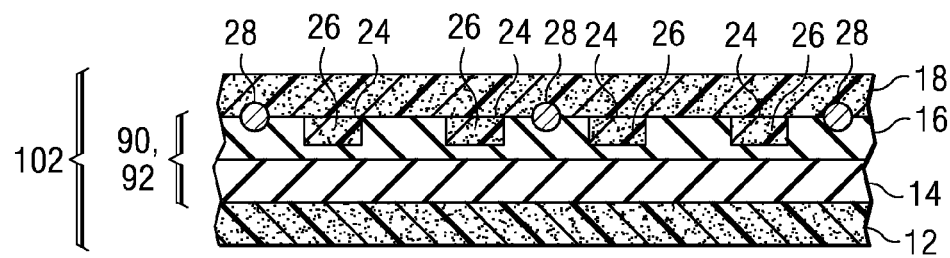
FIG. 29 illustrates a cross-sectional view of a subassembly created by the application of a moisture barrier to the subassembly illustrated in FIGS. 25 and 26.

Referring back to FIG. 1, shelter covering 20 is the final external layer of the shelter 10, and is applied to the subassembly 102 that is represented by FIG. 29. FIG. 2 effectively illustrates a cross-section of a wall 36 of subassembly 102 to which a shelter covering 20 has been applied.

Prior to application of the shelter covering 20 to the exterior surface of the moisture barrier 18, one of the polyethylene sheets between which the shelter covering 20 is sandwiched is removed. This results in the remaining polyethylene sheet on the shelter covering 20 being positioned toward the exterior of the shelter, while the side of the shelter covering 20 from which the polyethylene sheet is removed is positioned adjacent to the exterior surface of the moisture barrier 18, as illustrated in FIGS. 2-4. The remaining polyethylene sheet is left in place on the exterior surface of the shelter covering 20 until such time as curing of the curable polymer solution impregnated into the shelter covering 20 is desired.

Referring now to FIGS. 3 and 4, the shelter covering 20 is attached to the shell 12 at the upper surface of lip 13 and the bottom surface of lip 15 through the application of adhesives, staples, stitching, or any other means suitable for durable attachment of materials. Any of a wide variety of commercially available polyurethane adhesives, double sided tapes, staples or stitching techniques and materials are suitable.

A roof-to-wall seam 30, illustrated in FIG. 1, is then applied to the exterior surface of the shelter covering 20 so that the roof-to-wall seam 30 extends from about 4 inches to about 6 inches down the exterior of wall 36 of the shelter 10 and from about 4 inches to about 6 inches up the exterior of roof 38 of the shelter 10.

In embodiments in which the roof-to-wall seam 30 has been impregnated with a curable polymer solution and sandwiched between polyethylene sheets, one of the polyethylene sheets is removed prior to application of the roof-to-wall seam 30 to the shelter covering 20. This results in the remaining polyethylene sheet on the roof-to-wall seam 30 being positioned toward the exterior of the shelter, while the side of the roof-to-wall seam 30 from which the polyethylene, sheet is removed is positioned adjacent to the exterior surface of the shelter covering 20. The polyethylene sheet on the exterior surface of the roof-to-wall seam is left in place until such time as curing is desired.

In such embodiments, the shelter covering 20 is similarly prepared for the application of the roof-to-wall seam 30 by peeling back a sufficient amount of the remaining polyethylene sheet to allow for the application. Once the roof-to-wall seam 30 is applied to the shelter covering 20, the peeled-back portion of the remaining polyethylene sheet is replaced in its original position.

In some such embodiments, the roof-to-wall seam 30 is applied to the shelter covering 20 before appreciable curing of one or both of the roof-to-wall seam 30 and the shelter covering 20 has occurred. In such embodiments, the curable polymer solution acts as an adhesive and bonds the roof-to-wall seam 30 and the shelter covering 20 as the curable polymer solution cures. In other embodiments, the application of the roof-to-wall seam 30 to the shelter covering 20 be accomplished using any suitable adhesive such as a polyurethane adhesive or a double-sided tape.

Because curing of the curable polymer solution that is impregnated into the shelter covering 20 can be caused by ambient moisture, curing of the shelter covering 20 can begin as soon as the polyethylene sheet 22 (represented in FIG. 2) on the exterior surface of the shelter covering 20 is removed. Thus, in certain embodiments, curing is initiated by removing the polyethylene sheet as soon as desired after assembly of the shelter 10. In other embodiments, the assembled shelter is packaged and transported to a location distant from the location of assembly, and therefore curing is delayed by leaving the polyethylene sheet in place to prevent moisture from contacting the shelter covering 20.

Once a structure is constructed, such as a shelter 10 described above with respect to FIGS. 1-29 the volume of space occupied by the structure can be reduced in size through folding and vacuum packaging. In certain embodiments, for example a shelter occupying approximately 800 cubic feet of space when erected, the shelter can be reduced to about 3% of its original size by folding and compression and then restored to its original, erected configuration by unfolding the shelter and urging the roof into the desired position. In other embodiments, for example a shelter occupying approximately 3200 cubic feet of space when erected, the shelter can be reduced to less about 2% of its original size by folding and compression and then restored to its original, erected configuration by unfolding the shelter and urging the roof into the desired position.

Figure 30:
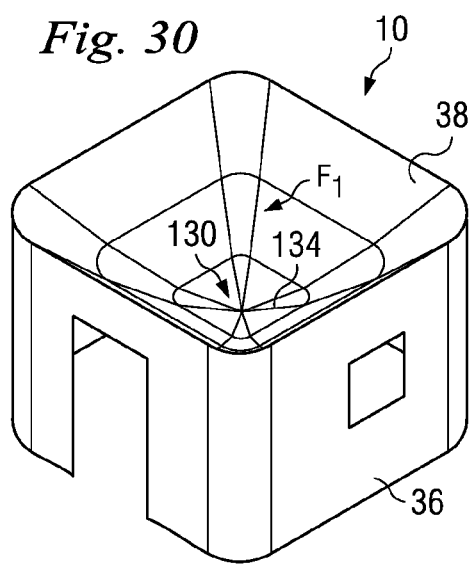
Figure 31:
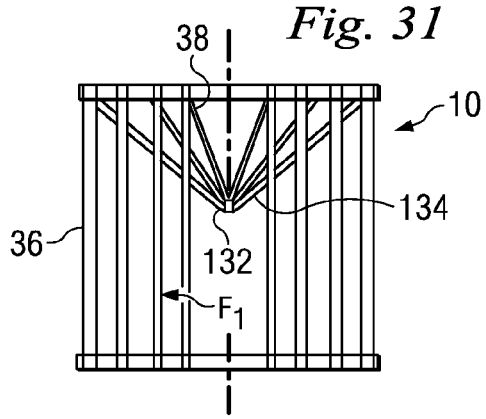
Figure 32:
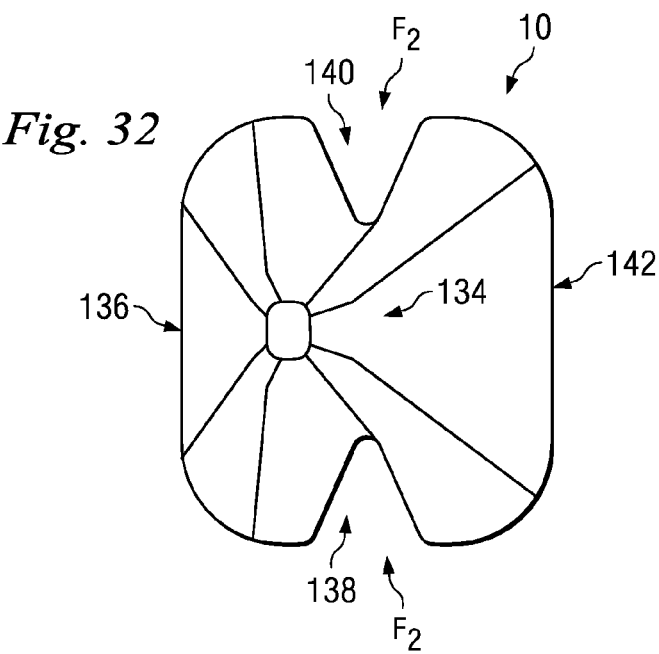

Referring now to FIGS. 30 and 31, a shelter 10 is folded by first collapsing the center 130 or ridge line 132 of the roof 38 into the interior space formed by the walls 36. With the roof 38 inverted into the interior space of the shelter 10, force "$F_1$" is applied to the interior surface of roof 38 to encourage the inward facing slope 134 to one side 136 of the interior of the shelter 10, as shown in the overhead view illustrated in FIG. 32. Additionally, forces "$F_2$" are applied to the approximate center of each of opposing sides 138 and 140, so as push the approximate centers of sides 138 and 140 toward the approximate center of the shelter 10.

Referring now to FIG. 33, while continuing to urge sides 138 and 140 toward the center of the shelter 10, forces "$F_3$" are applied along the entire wall surfaces of sides 136 and 142 so as to bring the two sides 136 and 142 closer to one another near the center of the compacted shelter 10. Optionally, forces "$F_3$" are applied at the approximate center of one side of the shelter 10 and at least two locations on opposing side of the shelter 10 that are symmetrically distal from the approximate center of side 142, as illustrated in FIG. 34. Such application of force on opposing sides 136 and 142 generally causes the respective sides to assume a "wrapped" configuration around the approximate center of the shelter. Optionally, the shelter 10 can be further reduced in size by folding it in half near the vertical centerline 150 of the shelter 10 and then folding it in the direction "R" near the horizontal centerline 152 of the shelter 10 (FIG. 35).

Figure 36:
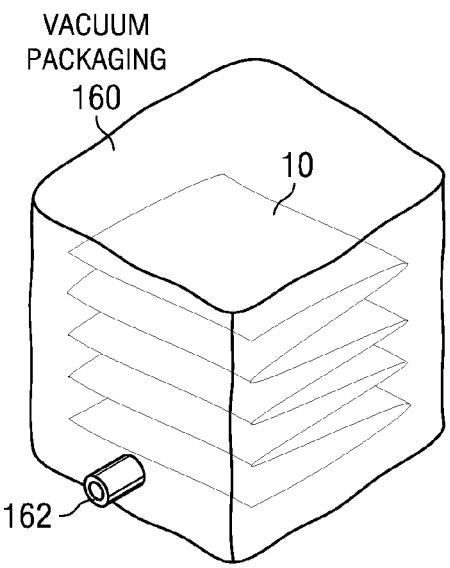
FIG. 36 illustrates a vacuum bag used in a process for reducing the size of the structure packaged within.

Referring now to FIG. 36, the compacted shelter 10 is placed into a bag 160. The material for the bag 160 should be flexible and moisture impervious in order to protect the curable polymer solution with which many of the structure components are treated and prevent premature curing of the structure while it is still in its packaging. Materials suitable for use in the bag 160 should have a maximum water vapor transmission rate of 0.1 gram/100 sq. in./day and a maximum oxygen transmission rate of about 0.0061 cu. in./100 sq. in./day. The material must also have a seal strength of at least about 6 lbs./in. and a tensile strength of at least about 2,000 psi.

The bag is to be equipped with an appropriate valve 162 allowing for the attachment of a vacuum apparatus. In certain embodiments, the bag is subjected to a vacuum apparatus 170 so that the shelter is further reduced in size, and moisture is prevented from reaching the stored shelter and curing the curable polymer solution in the shelter covering 20. Cooling the shelter to about 65° F. or lower prior to placement in the vacuum package also reduces the opportunity for the curable polymer solution impregnated in the shelter covering 20 to cure. In one embodiment, the material of bag 160 is a foil backed Mylar® laminate bag.

In addition to the application of a vacuum apparatus 170, nitrogen can be introduced into the bag 160 to displace oxygen and moisture further reducing the moisture content of the bag. To aid further in reducing the package size, compression forces 172 can be applied to the folded shelter 10 while the vacuum apparatus 170 is operating. The forces 172 are applied externally to the bag 160.

After the shelter 10 is reduced in size through folding and vacuum packaging, it is placed in a suitable shipping container.

To erect the shelter 10, the shelter 10 is removed from the bag 160. Upon removal from the bag, the shelter is readily returned to its pre-packaged form by unfolding the shelter 10, due to the rigidity provided by the shell 12, the wall core 90, the roof core 92, and the support members 26 as well as the elastic memory of inner core layers 14 and the outer core layers 16.

The shelter is returned to its pre-packaging form essentially by reversal of the process illustrated by FIGS. 30-35. The shelter 10 is placed in an upright position and the roof 38 is urged upward into a fully extended position. Any remaining polyethylene sheets covering the shelter covering 20, the roof-to-wall seam 30, and the lower edge flap 34 are removed and the curable polymer solution polymer in these components is allowed to cure. Curing will take place in response to the ambient moisture in the atmosphere; however, the curing process can be accelerated by applying a mist of water to the shell covering 20 at a rate not to exceed 1 gallon/500 sq. ft. of surface area of shelter 10.

The cure cycle will result in a sturdy shelter with roughly 90% of the shelter covering being cured in about 4 hours when moisture levels are from about 0.5 parts to about 10 parts curable polymer solution in the shelter covering 20.

After the shelter covering 20 has cured to about 75% or greater, the shelter 10 can be anchored to the ground or other foundations as describe above.

In some embodiments of shelters made according to the methods described herein, shelters can be equipped with flexible utility accommodations, including electrical wiring and flexible tubing or hose for water and fluid management. Further, the exterior and interior of structures made according to the methods described herein are readily adaptable to accommodate fixtures and amenities utilizing the same manufacturing practices already claimed. These fixtures and amenities include fixtures such as window units 40 (FIG. 1), additional walls, partitions, roof eaves, floors, porch overhangs, shutters, doors, vents, and built-in furniture.

Although alternative embodiments of the present invention will comprise substantially similar components as described herein, those skilled in the art will readily appreciate that there are other readily available methods of fabrication.

Figure 38:
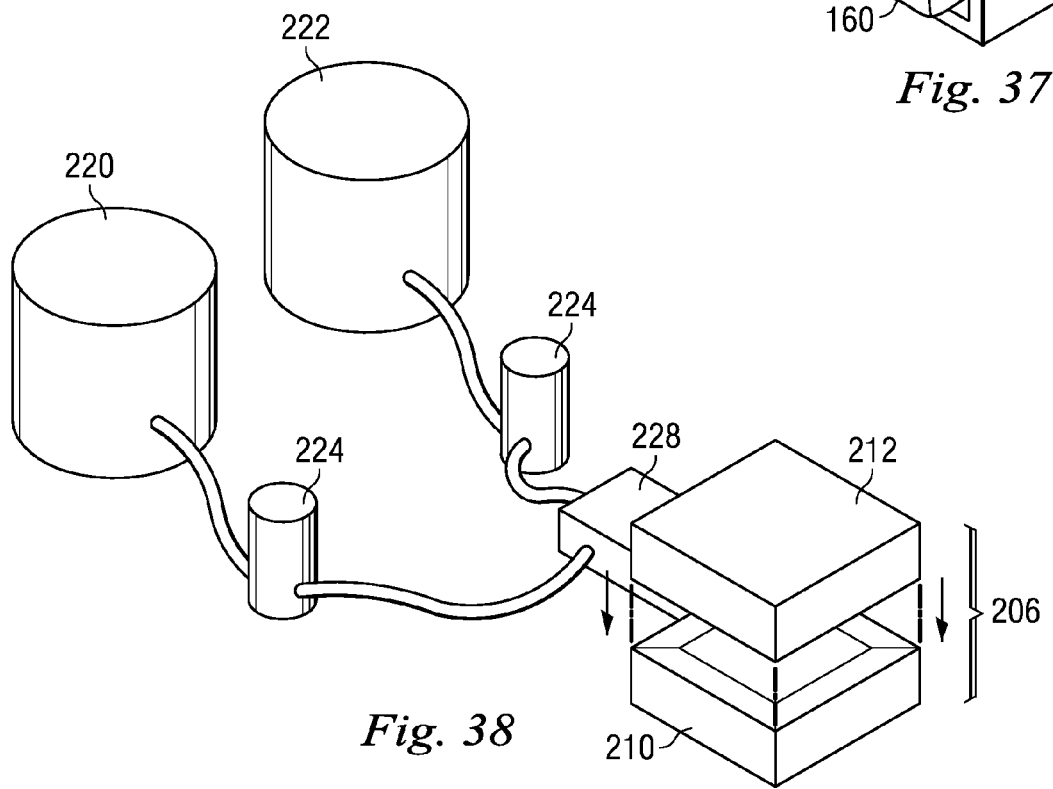
FIG. 38 illustrates a method of molding that can be used as an alternative means of manufacturing the structure illustrated in FIG. 1.

In some such alternative embodiments, the fabrication of the structure involves utilization of a reaction injection molding technology similar to that represented by RIM system 200 in FIG. 38. In certain of these embodiments, all of the component layers and members described above will generally be present, but the treatment of materials and method of assembly will be altered.

Figure 37:
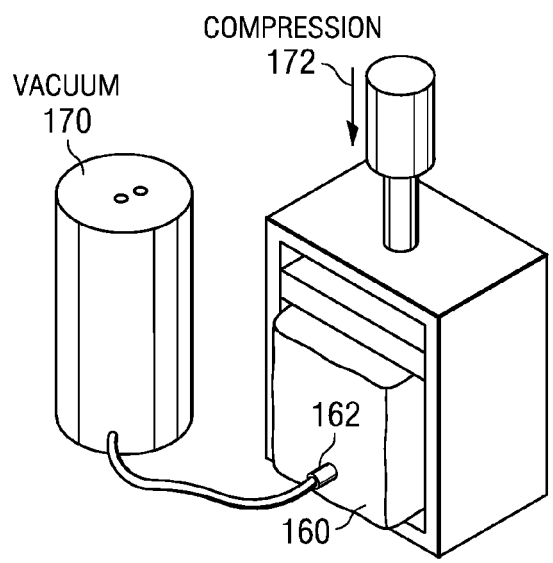
FIG. 37 illustrates a vacuum sequence for further reducing the size of the structure folded according to the folding sequence illustrated in FIG. 30-35.

In such embodiments, referring to FIGS. 1, 2, 10, and 11 (with continuing reference to FIG. 37 the shell 12 of the illustrated embodiments is impregnated with a curable polymer solution as previously described and placed in one of the bottom mold 210 and the top mold 212 of molding fixture 206 so that what will eventually be the exterior surface of the shell 12 is facing the other of the bottom mold 210 and the top mold 212. A shelter covering 20, not impregnated with a curable polymer solution, is placed in the other of the bottom mold 210 and the top mold 212 so that what will eventually be the interior surface of the shelter covering faces the other of the bottom mold and the top mold. When the shelter covering 20 and shell 12 are properly placed in the mold fixture 206, there is space between them into which other components of the structure may be placed.

In such embodiments, the support members 26, capture members 28, and looped ends 112 (FIG. 17), if intended to be embedded somewhere between the shelter covering 20 and the shell 12, are disposed in the molding fixture 206 between the shelter covering 20 and the shell 12 according to the desired locations of the components in the finished structure. FIG. 2 illustrates one example of where the support members 26 and capture member(s) 28 might be disposed in relation to the shelter cover 20 and the shell 12. The support members 26, capture member(s) 28, and looped ends 112 can be held in place by a spacing implement, suspended in between the bottom mold 210 and the top mold 212 by contact with the edges of the molding fixture, or otherwise secured by any other method suited to maintaining the components' positions within the molding fixture 206.

In such embodiments, the molding fixture 206 is then filled with a mixture of isocyanate and polyol that is delivered from tanks 220 and 222, respectively, metered by circulation pumps 224, and mixed and released into the closed molding fixture 206 by mixhead 228. In certain embodiments, an additive is introduced to the mixture to facilitate foaming of the polymer. In one such embodiment, the additive is water, which reacts with the isocyanate in the mixture to generate carbon dioxide that encourages foaming of the polymer.

In one embodiment, the liquid mixture enters the mixhead 228 at a pressure of anywhere from about 150 psi to about 3000 psi and is mixed thoroughly. In most embodiments, the liquid mixture of isocyanate and polyol passes from the mixhead 228 into the mold fixture 206 at about room temperature and atmospheric pressure. The exothermic reaction that forms the polyurethane polymer in the mold takes anywhere from about 5 minutes to about 10 minutes. The injected mixture will form a foamed polymer having physical characteristics similar to the combination of the inner core layer 14 and the outer core layer 16 in the previously described manufacturing process.

The curing of the injected polymer serves to adhere the formed foam layer to the shelter covering 20 and the shell 12, as well as embed the support members 26, capture members 28, and looped ends 112 within the formed foam.

Manipulation of the liquid polymer mixture, temperature, pressure, and time in the molding fixture can also produce a skin on the surface of the formed polymer layer upon curing. This skin can act as a moisture barrier 18, thus eliminating the need for the insertion of separate material to protect interiors layers of the shelter from moisture.

Once the formed foam layer has cured, the exterior surface of the shelter covering 20 can be spray-treated with an curable polyisocyanate polymer compound similar to those previously described herein prior to being packaged as previously described.

Those of ordinary skill in the art will recognize that the foam molding process could also be performed substantially as described above through the use of an open-pour cold molding process.

In yet another embodiment of the present invention, fabrication and assembly of the components of the structure are carried out substantially as in any particular embodiment described above, but without impregnating the shelter covering 20 with a curable polymer compound.

In some such embodiments, the shelter covering is not impregnated with a moisture-curable pre-polymer and the bag 160, illustrated in FIG. 36, is designed in such a way that the bag 160 acts as the outer-most covering and moisture barrier of the shelter 10.

In such an embodiment, the packaged size of the shelter 10 is substantially similar to that described above and illustrated in FIGS. 36 and 37. However, the bag used to package the shelter contains sufficient geometry and dimensions, in excess of that required to contain the packaged size of the shelter 10, to cover the entire surface area of the erected shelter 10. The excess bag material is packaged tightly, along with the shelter 10, but upon erection of the structure at the designated site the bag material is unfolded and used as the shelter's outer-most element of weather protection.

In still another embodiment of the present invention, the materials used to create the shelter covering 20 and shell 12, shown in FIG. 1, are suitable for sculpting or molding textures and receiving coloring and other printed matter. Some examples of such embodiments include shelter covering crafted to simulate brick, wood, stone, or shingles.

Although only a few exemplary embodiments of this invention have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures.

What is claimed is:

1. A structure comprising:
    a plurality of walls and a roof connected to and extending between the plurality of walls, each of the plurality of walls defining a plane that extends substantially perpendicular to a surface upon which the structure is deployed;
    a shell comprising a flexible material impregnated with a curable polymer compound, the shell defining an interior of the structure and forming an interior surface of the roof and an interior surface of each of the plurality of walls, wherein the curable polymer compound in the shell is cured;
    each of said plurality of walls comprising a flexible material impregnated with a curable polymer compound and disposed about an external surface of the shell;
    said roof comprising a flexible material impregnated with a curable polymer compound and disposed about an external surface of the shell; and
    a plurality of support members disposed within the plurality of walls;
    wherein each of the plurality of support members extends substantially parallel to the plane defined by the wall in which each said support member is disposed; and
    wherein the curable polymer compound in at least one of said plurality of walls and the roof is configured to allow delayed initiation of curing.

2. The structure of claim 1, further comprising a cover comprising a flexible material impregnated with a curable polymer compound, the cover being disposed about exterior surfaces of the wall section and the roof section and forming an exterior of the structure.

3. The structure of claim 2, wherein the curable polymer compound in the cover is cured.

4. The structure of claim 2, further comprising a moisture barrier layer disposed between the wall and the cover.

5. The structure of claim 2, further comprising a moisture barrier layer disposed between the roof and the cover.

6. The structure of claim 2, wherein the flexible material of the cover comprises an open cell plastic material selected from the group consisting of polyether, polyolefin, polyester, polyurethane and combinations thereof.

7. The structure of claim 6, wherein the flexible material of the cover comprises polyester felt.

8. The structure of claim 1, wherein the curable polymer compound in the wall and the roof is cured.

9. The structure of claim 1, wherein the curable polymer compound comprises a polyisocyanate.

10. The structure of claim 9 wherein the curable polymer compound comprises 4,4'-diphenylmethane diisocyanate.

11. The structure of claim 1, wherein the curable polymer compound is cured by exposure to ambient moisture.

12. The structure of claim 1, wherein the shell further comprises a lip having opposed upper and lower surfaces and a first end of each of said plurality of walls is attached to the lower surface of the shell lip and a first end of the roof is attached to the upper surface of the shell lip.

13. The structure of claim 1, wherein the flexible material of the shell, said plurality of walls and said roof comprises an open cell plastic material selected from the group consisting of polyether, polyolefin, polyester, polyurethane and combinations thereof.

14. The structure of claim 13, wherein the flexible material of said shell, said plurality of walls and said roof comprises polyester felt.

15. The structure of claim 1, further comprising a plurality of support members disposed within the roof section.

16. The structure of claim 15, wherein the roof defines a plane and each of the plurality of support members extends substantially parallel to a plane defined by the roof section in which that support member is disposed.

17. The structure of claim 15, wherein the roof defines a contour and each of the plurality of support members extends so as to substantially conform to the contour.

18. A structure comprising:
    a shell comprising a flexible material impregnated with a curable polymer compound, the shell forming the interior of the structure and defining a wall portion and a roof portion of the structure, wherein the curable polymer compound in the shell is cured;
    a wall core comprising a flexible material impregnated with a curable polymer compound and disposed about the wall portion of the shell,
    a roof core comprising a flexible material impregnated with a curable polymer compound and disposed about the roof portion of the shell,
    a plurality of support members disposed within the wall core and the roof core;
    a cover comprising a flexible material impregnated with a curable polymer compound, the cover being disposed about the wall core and the roof core and forming the exterior of the structure; and
    a capture system disposed within the wall core and the roof core for securing the structure to a surface.

19. The structure of claim 18, wherein the capture system comprises a plurality of capture members having looped ends for securing the structure to the surface.

20. The structure of claim 18, wherein the flexible material of the cover comprises an open cell plastic material selected from the group consisting of polyether, polyolefin, polyester, polyurethane and combinations thereof.

21. The structure of claim 20, wherein the flexible material of the cover comprises polyester felt.

22. The structure of claim 18, further comprising a plurality of support members disposed within the roof portion.

23. The structure of claim 22, wherein the roof portion defines a plane and each of said plurality of support members extends substantially parallel to a plane defined by the roof portion in which each said support member is disposed.

24. The structure of claim 22, wherein the roof portion defines a contour and each of said plurality of support members extends so as to substantially conform to the contour.

* * * * *